United States Patent
Uchida et al.

(10) Patent No.: US 6,771,580 B2
(45) Date of Patent: Aug. 3, 2004

(54) DATA REPRODUCTION APPARATUS

(75) Inventors: Akiyoshi Uchida, Kawasaki (JP); Masakazu Taguchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 473 days.

(21) Appl. No.: 09/863,057

(22) Filed: May 22, 2001

(65) Prior Publication Data

US 2002/0056744 A1 May 16, 2002

(30) Foreign Application Priority Data

May 22, 2000 (JP) ........................................ 2000-150353
Apr. 25, 2001 (JP) ........................................ 2001-128381

(51) Int. Cl.$^7$ ................................................ G11B 5/76
(52) U.S. Cl. ................................ 369/59.22; 369/47.35
(58) Field of Search ........................ 369/47.15, 47.35, 369/53.31, 59.21, 59.22, 59.23, 124.05; 375/340, 341

(56) References Cited

U.S. PATENT DOCUMENTS 5,719,843 A * 2/1998 Nakajima et al. ........ 369/59.22
5,781,590 A * 7/1998 Shiokawa et al. .......... 375/341

FOREIGN PATENT DOCUMENTS

| JP | 8-37466 | 2/1996 |
| JP | 8-83470 | 3/1996 |
| JP | 10-336045 | 12/1998 |

* cited by examiner

Primary Examiner—Paul W. Huber
(74) Attorney, Agent, or Firm—Greer, Burns & Crain, Ltd.

(57) ABSTRACT

According to the present invention, a data reproduction apparatus sampling, at a given rate, a reproduced signal obtained from a recording medium and complying with a partial response waveform, and reproducing data from sampled values of the reproduced signal in accordance with the Viterbi decoding algorithm includes difference value calculation means for calculating a difference between compared ones of path metric values in selecting paths, alternative path selection means for selecting a path different from a corresponding one of the paths, which are selected in accordance with a given rule, as an alternative path based on the difference between the compared ones of the path metric values, and reproduced data determination means for determining data to be reproduced based on the paths selected in accordance with the given rule and the alternative path.

12 Claims, 26 Drawing Sheets

Block diagram showing a structure of a Viterbi detector of the data reproduction apparatus according to the embodiment of the present invention Block diagram of a Viterbi detector Diagram showing sampled values of a reproduced signal complying with PR(1, 1)

Diagram showing a relation between paths selected in an ACS and states

Diagram showing a survivor path determined in a PM

Diagram showing sampled values of a reproduced signal complying with PR(1, 1) and affected by a noise Diagram showing a relation between the paths selected in the ACS and the states Diagram showing a survivor path determined in the PM Block diagram showing a structure of a Viterbi detector of the data reproduction apparatus according to the embodiment of the present invention Diagram for illustrating an operation of an actual sample comparison circuit Diagram for illustrating an example of selection of detected data Diagram for illustrating another example of selection of detected data Diagram showing sampled values in a case where a sampling frequency is doubled Diagram for illustrating an operation of the actual sample comparison circuit in the case where the sampling frequency is doubled Diagram showing a recording pattern by a parallel recording method Diagram showing sampled values including an error Diagram for illustrating detected data demodulated from the sampled values shown in FIG. 19

Diagram for illustrating an operation of the actual sample comparison circuit

Diagram showing an addition code of parity information

FIG.23

Diagram showing errors that can be detected by parity information added in accordance with the addition code shown in FIG. 22

6nth

| ERROR LENGTH | α | β | γ | δ |
|---|---|---|---|---|
| 1 | × | × | × |   |
| 2 | × | × | × |   |
| 3 | × |   | × | × |
| 4 |   |   |   |   |
| 5 | × | × |   |   |
| 6 | × | × |   |   |

6n+1th

| ERROR LENGTH | α | β | γ | δ |
|---|---|---|---|---|
| 1 |   | × |   | × |
| 2 | × | × | × | × |
| 3 | × | × | × | × |
| 4 |   |   |   |   |
| 5 | × | × | × |   |
| 6 | × | × | × |   |

6n+2th

| ERROR LENGTH | α | β | γ | δ |
|---|---|---|---|---|
| 1 | × |   |   |   |
| 2 | × | × | × | × |
| 3 | × | × | × | × |
| 4 |   |   |   |   |
| 5 | × |   | × | × |
| 6 | × | × | × | × |

6n+3th

| ERROR LENGTH | α | β | γ | δ |
|---|---|---|---|---|
| 1 |   | × | × | × |
| 2 | × | × | × | × |
| 3 |   | × | × | × |
| 4 |   |   |   |   |
| 5 |   | × |   | × |
| 6 | × | × |   | × |

6n+4th

| ERROR LENGTH | α | β | γ | δ |
|---|---|---|---|---|
| 1 | × |   |   | × |
| 2 | × | × | × | × |
| 3 | × |   | × | × |
| 4 |   |   |   |   |
| 5 | × | × |   |   |
| 6 | × | × |   |   |

6n+5th

| ERROR LENGTH | α | β | γ | δ |
|---|---|---|---|---|
| 1 | × |   |   |   |
| 2 | × | × | × | × |
| 3 | × | × | × | × |
| 4 |   |   |   |   |
| 5 | × | × |   |   |
| 6 | × | × | × | × |

Block diagram showing another structure of the Viterbi detector

Diagram showing sampling of a reproduced signal

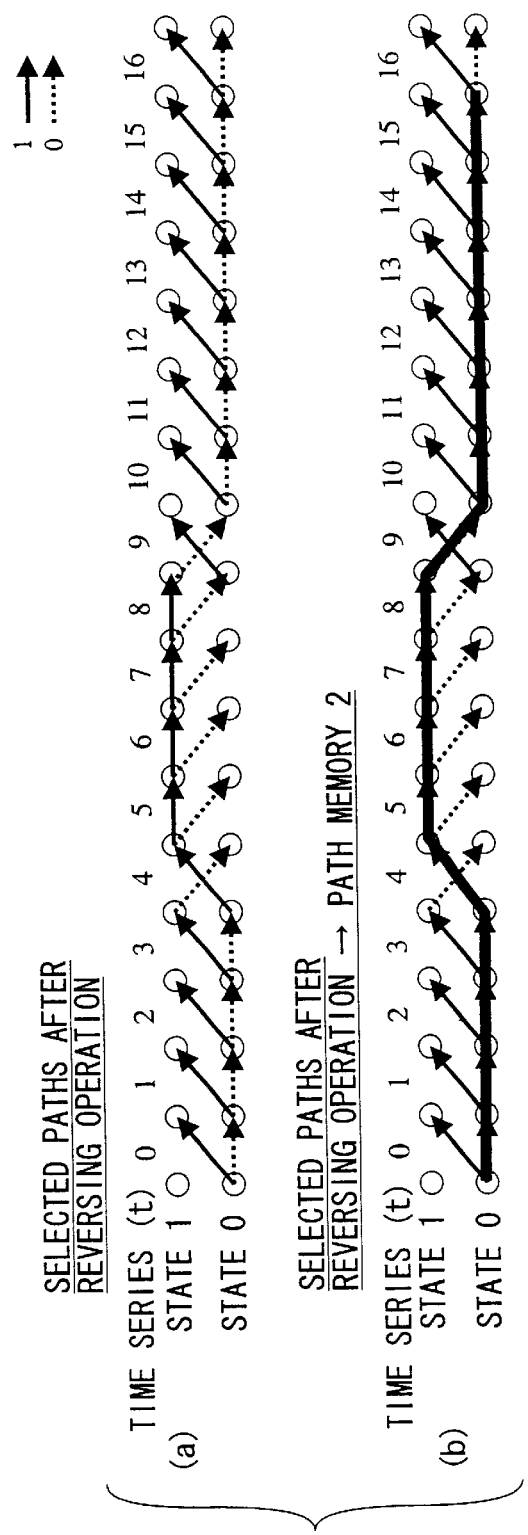
FIG.28 Diagram showing selected paths and a final selected path wherein low-reliability paths in the selected paths and the final selected path shown in FIG. 26 are changed (reversed)

DATA REPRODUCTION APPARATUS

BACKGROUND OF THE INVENTION

1. Field of the Invention

The present invention generally relates to data reproduction apparatuses for reproducing recorded data from media such as optical disks, and more particularly to a data reproduction apparatus for reproducing data from a reproduced signal from a recording medium recorded with data in accordance with a recording signal of a partial response waveform.

2. Description of the Related Art

For instance, attempts have been made to use a magneto-optical disk unit, which is a data reproduction apparatus, in a variety of fields such as the recording and reproduction of image information and various code data for computers because of its large capacity, low price, and high reliability. Such a magneto-optical disk unit is expected to have a larger capacity, and is required to record data with high density and reproduce the data with high accuracy.

Proposed as a method of recording and/or reproducing data with high accuracy is a technique to detect maximum likelihood (ML) data by using a maximum likelihood data detector such as a Viterbi detector after sampling at a given sampling frequency a reproduced signal from a magneto-optical disk recorded with a recording signal obtained by modulating data to be recorded into a so-called partial response (PR) waveform.

Such a Viterbi detector has a structure shown in FIG. 1.

In FIG. 1, a Viterbi detector 100 includes a branch metric calculation unit (hereinafter referred to simply as a BM) 101, an Add-Compare-Select unit (hereinafter referred to simply as an ACS) 102, a path metric memory (hereinafter referred to simply as a PMM) 103, and a path memory (hereinafter referred to simply as a PM) 104.

In the Viterbi detector 100 that is applied to the data reproduction system of a magneto-optical disk unit, a sampled value yt of a reproduced signal from the magneto-optical disk is supplied to the BM 101, and the BM 101 calculates a branch metric value (hereinafter referred to simply as a BM value) that is a difference between the sampled value yt and each expected value. The expected values, which depend on a partial response waveform used in data recording, are values that the reproduced signal is expected to take correctly. The BM value is calculated with respect to each expected value when the one sampled value yt is supplied to the BM 101.

The ACS 102 adds the BM values to path metric values (hereinafter referred to simply as PM values) of a preceding clock timing, and compares each given two of obtained PM values. Then, as a result of the comparisons, the ACS 102 selects the smaller of each given two PM values as a new PM value, and stored the selected PM values in the PMM 103. As a result of such a process, BM values are accumulated to be the PM values. Selecting the smaller of each given two PM values as previously described corresponds to selecting a state transition path. That is, the ACS 102 always selects a state transition path that minimizes the PM value.

Data (binary data) corresponding to the paths selected in the above-described manner is supplied from the ACS 102 to the PM 104. The PM 104 shifts the data corresponding to the selected paths successively, and in the process, discards data corresponding to paths determined unselected based on the continuity of state transition. Then, the PM 104 outputs data corresponding to a survivor path as detected data.

As previously described, by detecting the maximum likelihood data by using the Viterbi detector 100 as well as modulating recording data into a recording signal having a partial response waveform and recording the recording signal on the magneto-optical disk, data recorded with high density on the magneto-optical disk is reproduced therefrom with high accuracy. Such a recording and reproduction technique is called a partial response maximum likelihood (hereinafter referred to simply as PRML) technique.

For instance, in the case of recording, in accordance with a PR(1, 1) waveform, a magneto-optical disk with a signal obtained by modulating data of the 1T sequential pattern "10101010 . . . ", sampled values of a signal reproduced from the magneto-optical disk are as shown in FIG. 2. That is, since a recording signal based on PR(1, 1) corresponds to a bit string obtained by adding the bit string of the data and the bit string of the data shifted by one bit (1+D), the sampled values of the reproduced signal corresponding to the recording signal are "00001111110000000" as shown in FIG. 2 when the data is "00001010100000000".

In the case of inputting the sampled values shown in FIG. 2 to the Viterbi detector 100 of FIG. 1, the paths selected in the ACS 102 and states has a relation shown in FIG. 3.

In FIG. 3, the states are indicated by circles and the state transition paths are indicated by arrows. In this case, each state is either 0 or 1, and the state transition paths are classified into four types: state 0 to state 0, 0 to 1, 1 to 0, and 1 to 1. A solid arrow indicates a path to state 1, and a dotted arrow indicates a path to state 0.

In the PM 104, the paths selected in the ACS 102 are discarded one after another so that a survivor path is determined. For instance, in (2) through (9) of a time series shown in FIG. 3, neither solid nor broken arrow can be defined as a path (no-merge), and, thereafter in the time series, if such state is entered that paths can be determined (merge), either solid or broken arrows are defined as paths. As a result, for instance, arrows enclosed by a dotted line in FIG. 4 become the survivor path, and data "0000101010000000" corresponding to the arrows enclosed by the dotted line is obtained as detected data, which matches the original data.

In some cases, the sampled values shown in FIG. 2 are deviated by the effect of noise. Suppose that the reproduced signal (sampled values) that should be obtained correctly as shown in FIG. 2 is obtained as shown in FIG. 5 in which the level of the reproduced signal is lowered by a noise at a time (9). In this case, if sampled values shown in FIG. 5 are input to the Viterbi detector 100 one after another, the paths selected in the ACS 102 and states has a relation shown in FIG. 6. In FIG. 6, only a path at the time (9) is different from that in FIG. 3. However, detected data includes more than one error bit.

If the sampled values shown in FIG. 5 are input to the Viterbi detector 100, paths enclosed by a dotted line in FIG. 7 are defined as a survivor path in the PM 104. Paths in (3) through (9) of the time series in FIG. 7 are different from paths corresponding to the data shown in FIG. 4 which data should correctly be detected. That is, the above-described error path (at the time (9)) causes the detected data to include six error bits.

As described above, since the conventional Viterbi detector determines paths based on the continuity of state transition, a determined (survivor) path may includes sequential errors if a sampled value has an error to change a corresponding path. As a result, detected value corresponding to the determined path may include sequential bit errors.

SUMMARY OF THE INVENTION

It is an object of the present invention to provide a data reproduction apparatus having a high data detection capability and good noise immunity.

The above object of the present invention is achieved by a data reproduction apparatus claimed in claim 1 sampling at a given rate a reproduced signal complying with a partial response waveform, calculating branch metric values in accordance with the Viterbi decoding algorithm by employing expected values defined by the partial response waveform and each of sampled values, calculating path metric values based on the branch metric values, selecting paths corresponding to data state transition in accordance with a given rule based on comparison results of the path metric values, and reproducing data based on the selected paths, the reproduced signal being obtained from a recording medium, which data reproduction apparatus includes difference value calculation means for calculating a difference between compared ones of the path metric values in selecting a corresponding one of the paths, alternative path selection means for selecting a path different from the corresponding one of the paths, which are selected in accordance with the given rule, as an alternative path based on the difference between the compared ones of the path metric values calculated in the difference value calculation means, and reproduced data determination means for determining data to be reproduced based on the paths selected in accordance with the given rule and the alternative path selected in the alternative path selection means.

According to the above-described data reproduction apparatus, it can be considered that greater the difference between the compared ones of the path metric values in selecting the corresponding one of the paths, higher the reliability of the selected path, while smaller the difference (closer the compared ones of the path metric values), lower the reliability of the selected path. The data to be reproduced is determined by considering the paths selected in accordance with the given rule and the alternative path selected based on the difference between the compared ones of the path metric values which difference is capable of representing the reliability of the corresponding one of the selected path.

If the reproduced signal obtained from the recording medium complies with the partial response waveform, it does not matter whether a recording signal recorded on the recording medium itself complies with the partial response waveform. Data may be recorded on the recording medium in accordance with a recording signal of the partial response waveform, or, for instance, the reproduced signal may be obtained in a state where waveform interference like the partial response waveform is substantially caused by optically reading a plurality of recording pits collectively in a reproduction system.

As claimed in claim 2, from a relation between the difference between the compared ones of the path metric values and the reliability of the selected path, the alternative path selection means may include judgment means for judging whether the difference between the compared ones of the path metric values is smaller than a predetermined value, and the alternative path may be selected if the judgment means judges that the difference between the compared ones of the path metric values is smaller than the predetermined value.

As a condition for selecting the alternative path, other conditions may be provided based on the difference of the compared ones of the path metric values. For instance, the alternative path is determined based on the priorities of the differences between the compared ones of the path metric values, which priorities are given in descending order of their magnitudes.

As claimed in claim 3, in the above-described data reproduction apparatus, the reproduced data determination means may include: first candidate data generation means for generating a first candidate data string corresponding to a first path string selected in accordance with the given rule; second candidate data generation means for generating a second candidate data string corresponding to a second path string obtained by changing a path of the first path string, the path corresponding to the alternative path selected in the alternative path selection means; and data selection means for selecting one of the first and second candidate data strings based on a given criterion for likelihood, and the first or second candidate data string selected in the data selection means may be determined as the data to be reproduced.

As claimed in claim 4, in the light of determining likely data on the basis of an actual sampled value string of the reproduced signal, in the above-described data reproduction apparatus, the data selection means may include: first sampled value generation means for generating a first candidate sampled value string from the first candidate data string based on a characteristic of the partial response waveform; second sampled value generation means for generating a second candidate sampled value string from the second candidate data string based on the characteristic of the partial response waveform; and actual sampled value judgment means for judging which of the first or second candidate sampled value string is closer to a sampled value string obtained from the reproduced signal, and one of the first and second candidate data strings may be selected as a data string with more likelihood, the one corresponding to one of the first and second candidate sampled value strings judged closer to the sampled value string obtained from the reproduced signal in the sampled value judgment means.

As claimed in claim 5, the above-described first candidate data string may be obtained based on the first path string set in a given range in a string of the paths selected in accordance with the given rule, the given range including the path corresponding to the alternative path.

In this case, the second candidate data string may be obtained in accordance with the second path string obtained by changing the path of the first path string set as described above, the path corresponding to the alternative path selected in the alternative path selection means.

As claimed in claim 6, more specifically, the above-described first candidate data string may be obtained based on the first path string at a timing when the difference between the compared ones of the path metric values reaches the value for selecting the alternative path in a process of selecting the paths in accordance with the given rule, the first path string continuing up to the timing for a given period of time.

Further, as claimed in claim 7, in the light of providing a data reproduction apparatus having a high data detection capability and good noise immunity, in the above-described data reproduction apparatus, the above-described first candidate data generation means may generate the first candidate data string of a given length, the second candidate data generation means may generate the second candidate data string of the given length, and the data selection means may perform error detection on the first and second candidate data strings by employing a given error detection technique and select the one of the first and second candidate data strings based on a result of the error detection.

According to such a data reproduction apparatus, error detection is performed, in accordance with a given error detection technique, on the first candidate data string generated in accordance with the first path string selected in accordance with the given rule, and on the second candidate data string generated in accordance with the second path string obtained by changing to the alternative path the path corresponding to the alternative path selected based on the difference between the compared ones of the path metric values which difference is capable of representing the reliability. Based on the results of the error detection, one of the candidate data strings from which one no error is detected, for instance, is selected as data with more likelihood.

The given error detection technique is not limited to a particular one, but may be the technique of ECC (Error Correcting Code) or the technique of a parity check as claimed in claim 8.

As claimed in claim 9, in the light of preventing a decrease in accuracy of data generated based on the path string selected in accordance with the given rule, in the above-described data reproduction apparatus, the data selection means may select the first candidate data string if an error is detected from each of first and second candidate data.

As claimed in claim 10, in the above-described data reproduction apparatus, in a case where more than one alternative path is selected in the alternative path selection means and exists when the first path string corresponding to the first candidate data of the given length is selected, the second candidate data generation means may generate a plurality of second path strings by employing the alternative paths by ones, or by twos or more, and generates a plurality of second candidate data strings corresponding to the second path strings, and the data selection means may select the one of the first and second candidate data.

According to such a data reproduction apparatus, one of the first candidate data string and the second candidate data strings is selected as likely data. An increase in the number of candidate data strings subjected to the selection allows the reproduction of data having more likelihood.

As claimed in claim 11, in the light of making an operation for obtaining basic information (the string of the paths, the alternative path string, the first candidate data string) and an operation for generating likely data from the basic information independent of each other, the above-described data reproduction apparatus may include a memory unit for storing the string of the paths selected in accordance with the given rule, information on the difference between the compared ones of the path metric values, the difference being calculated in said difference calculation means, and the first candidate data string generated in the first candidate data generation means in the reproduced data determination means, wherein the alternative path selection means for selecting the alternative path based on the string of the paths and the information on the difference between the compared ones of the path metric values stored in the memory unit, the second candidate data generation means for generating the second candidate data string based on the string of the paths stored in the memory unit and the alternative path selected in the alternative path selection means, and the data selection means for selecting the one of the first candidate data stored in the memory unit and the second candidate data generated in the second candidate data generation means may operate in accordance with a synchronizing clock different from a reference clock employed for selecting the string of the paths, calculating the difference of the compared ones of the path metric values, and generating the first candidate data.

As claimed in claim 12, in the light of performing an operation for generating the likely data with higher speed, the synchronizing clock may be faster than the reference clock.

BRIEF DESCRIPTION OF THE DRAWINGS

FIG. 23 is a diagram showing errors that can be detected by parity information added in accordance with the addition code shown in FIG. 22;

FIG. 28 is a diagram showing selected paths and a final selected path wherein low-reliability paths in the selected paths and the final selected path shown in FIG. 26 are changed (reversed).

DETAILED DESCRIPTION OF THE PREFERRED EMBODIMENTS

A description will now be given, with reference to the accompanying drawings, of embodiments of the present invention. In the following embodiments, PR(1, 1)ML is applied to data recording and reproduction. However, other forms of PRML such as PR(1, 2, 1)ML, PR(1, 3, 3, 1)ML, and PR(1, 0, −1)ML are applicable to the data recording and reproduction.

Figure 8:
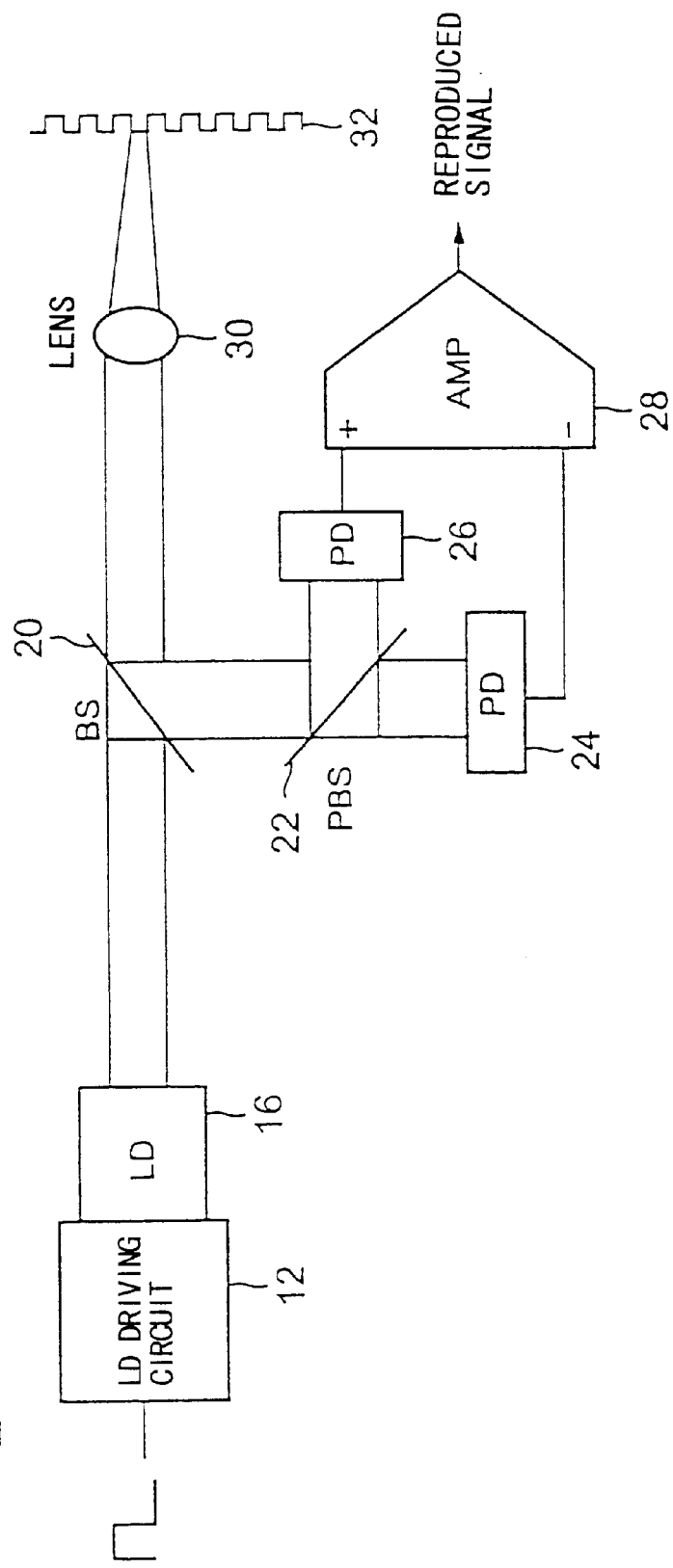
FIG. 8 is a block diagram showing a structure of a signal reproduction circuit of a magneto-optical disk unit according to an embodiment of the present invention.

A signal reproduction circuit of a magneto-optical disk unit 1 including a data reproduction apparatus according to an embodiment of the present invention has a structure shown in FIG. 8.

In FIG. 8, a LD (Laser Diode) driving circuit 12, based on a pulse-like driving signal supplied at a time of data reproduction, causes an LD (Laser Diode) to emit light. The laser light emitted from the LD 16 is transmitted through a beam splitter (BS) 20 to be projected onto a magneto-optical disk 32 via a lens 30. The lens 30 collects the incident laser light so as to focus the incident laser light into a beam spot on a surface of the magneto-optical disk 32. The magneto-optical disk unit 1 includes a magnetic head (not shown) that produces a magnetic field on the surface of the magneto-optical disk 32.

When the laser light is projected into the beam spot on the magneto-optical disk 32, a light reflected back from the magneto-optical disk 32 is made incident on the beam splitter 20 via the lens 30. Then, the reflected light is further reflected by the beam splitter 20 to be incident on another beam splitter 22. The laser light incident on the beam splitter 22 is divided in two directions in accordance with polarization components, and laser lights in the two directions are made incident on photodiodes (PDs) 24 and 26, respectively. Each of the photodiodes 24 and 26 converts the incident light into an electrical signal and outputs the electrical signal to an amplifier 28. The amplifier 28 amplifies the electrical signals supplied from the photodiodes 24 and 26 to output a reproduced signal corresponding to a signal recorded on the magneto-optical disk 32.

Figure 9:
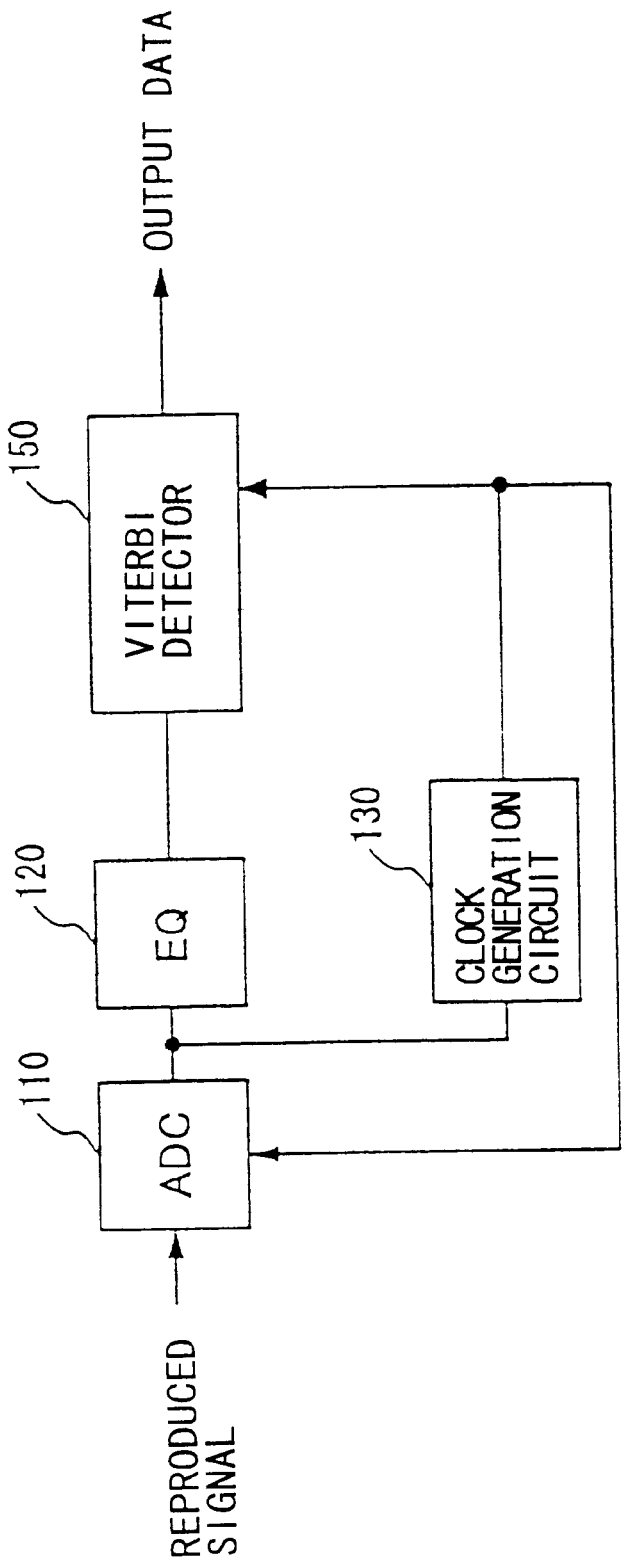
FIG. 9 is a block diagram showing a structure of a data reproduction apparatus of the magneto-optical disk unit according to the embodiment of the present invention.

A data reproduction system of the magneto-optical disk unit 1 has a structure shown in FIG. 9.

In FIG. 9, the data reproduction system includes an analog-to-digital converter (ADC) 110, a digital equalizer (EQ) 120, a clock generation circuit 130, and a Viterbi detector 150. The analog-to-digital converter 110 converts the reproduced signal (analog signal) supplied from the signal reproduction circuit of FIG. 8 into a digital signal. A filter for waveform shaping may be provided, if required, between the amplifier 28 shown in FIG. 8 and the analog-to-digital converter 110.

The analog-to-digital converter 110 operates in synchronism with a clock signal supplied from the clock generation circuit 130. That is, the reproduced signal is sampled in synchronism with the clock signal by the analog-to-digital converter 110, and sampled values are output therefrom.

The sampled values output successively from the analog-to-digital converter 110 in synchronism with the clock signal are subjected to waveform shaping in the digital equalizer 120 to be supplied to the Viterbi detector 150. The Viterbi detector 150 operates in synchronism with the clock signal supplied from the clock generation circuit 130. The Viterbi detector 150 detects recorded data from the successively supplied sampled values in accordance with the Viterbi decoding algorithm, and outputs the recorded data.

Figure 10:
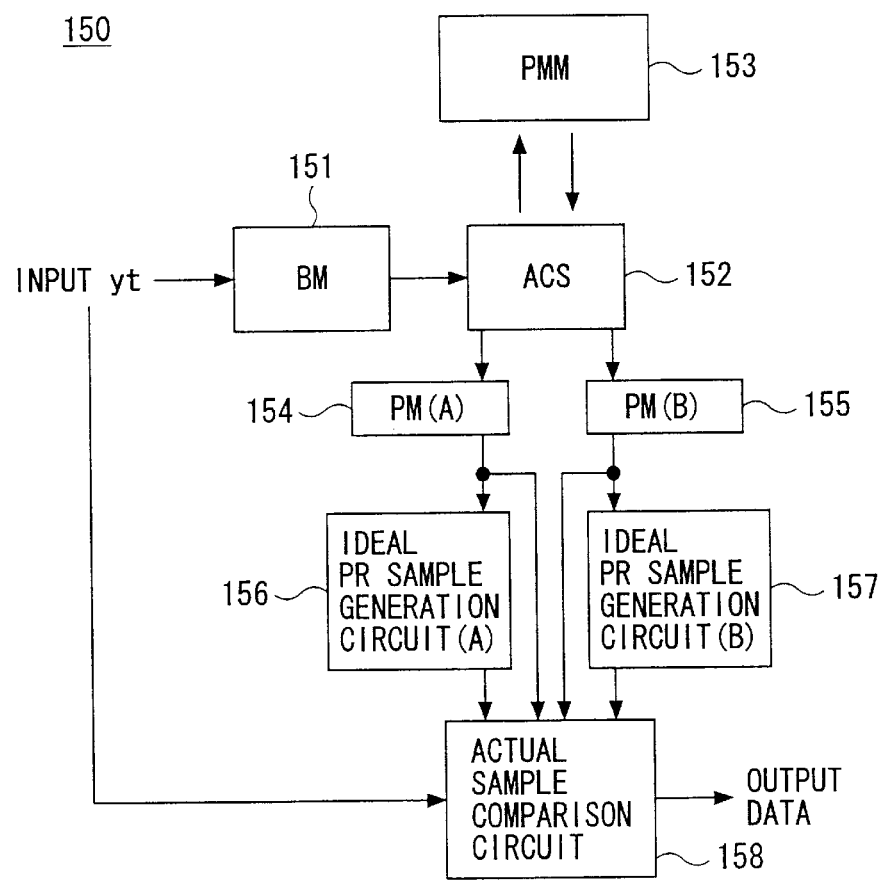
FIG. 10 is a block diagram showing a structure of a Viterbi detector of the data reproduction apparatus according to the embodiment of the present invention.

The Viterbi detector 150 has a structure shown in FIG. 10.

In FIG. 10, the Viterbi detector 150, like a conventional Viterbi detector, includes a BM (branch metric calculation unit) 151, an ACS (add-compare-select unit) 152, a PMM (path metric memory) 153. Further, the Viterbi detector 150 includes two path memories PM(A) (path memory A) 154 and PM(B) (path memory B) 155, an ideal PR sample generation circuit (A) 156, an ideal sample generation circuit 157, and an actual sample comparison circuit 158.

Hereinafter, a description will be given of an operation performed in a case where PR(1, 1)ML is employed, and there are two states of 1 and 0, four state transition types of "0 to 0", "0 to 1", "1 to 0", and "1 to 1", and three expected values of 0, 1, and 2.

The BM 151 calculates, in accordance with the following expressions (1) through (4), BM values BM0, BM1, BM2, and BM3 that are differences between a sampled value yt of the reproduced signal supplied via the digital equalizer 120 and the expected values 0, 1, and 2:

$$BM0=|yt-0| \qquad (1)$$

$$BM1=|yt-1| \qquad (2)$$

$$BM2=|yt-1| \qquad (3)$$

$$BM3=|yt-2| \qquad (4)$$

The BM 151 supplies the ACS 152 with the BM values BM0 through BM3 calculated in accordance with the above-described expressions (1) through (4). The ACS 152, based on state transition, adds PM values PM0(t−1) and PM1(t−1) of a preceding clock timing stored in the PMM 153 to the supplied BM values BM0 through BM3 to calculate new PM values PM0(t) and PM1(t) based on the following expressions (5) and (6):

$$PM0(t)=\min\{BM0(t)+PM0(t-1), BM1(t)+PM1(t-1)\} \qquad (5)$$

$$PM1(t)=\min\{BM2(t)+PM0(t-1), BM3(t)+PM1(t-1)\} \qquad (6)$$

Each of the above-described expressions (5) and (6) indicates a calculation of selecting the smaller of values enclosed by brackets { }. In each of the expressions (5) and (6), if a left value in the brackets { } is selected, the ACS 152 supplies 0 to the PM(A) 154 as a selected path, and if a right value in the brackets { } is selected, the ACS 152 supplies 1 to the PM(A) 154 as a selected path. The selected path corresponding to the value thus supplied to the PM(A) 154 is referred to as the first candidate selected path.

Further, the ACS 152, in accordance with the following expressions (7) and (8), calculates differential path metric values (hereinafter referred to simply as D-PM values) that are defined by differences between the left and right values in the brackets { } of the above-described expressions (5) and (6):

$$D\text{-}PM0(t)=|\{BM0(t)+PM0(t-1)\}-\{BM1(t)+PM1(t-1)\}| \quad (7)$$

$$D\text{-}PM1(t)=|\{BM2(t)+PM0(t-1)\}-\{BM3(t)+PM1(t-1)\}| \quad (8)$$

With respect to each of the expressions (5) and (6), a smaller D-PM value means that paths corresponding to the right and left values in the brackets { } are closer in the degree of likelihood, so that it can be inferred that the selected path is probably wrong. Therefore, the ACS 152 compares the magnitudes of the D-PM value and a given PM judgment value (hereinafter referred to simply as a J-PM value). If the D-PM value is greater than or equal to the J-PM value, the two paths are definitely different in likelihood so that the ACS 152 judges that the selected PM value is reasonable so as to supply the PM(B) 155 with the same selected path value as the PM(A) 154. On the other hand, if the D-PM value is smaller than the J-PM value, the two paths are only slightly different in likelihood so that the ACS 152 doubts the reasonability of the selected PM value so as to supply the PM(B) 155 with a selected path value opposite to that supplied to the PM(A) 154. The selected path corresponding to the value thus supplied to the PM(B) 155 is referred to as the second candidate selected path.

In each of the PM(A) 154 and PM(B) 155, data corresponding to the selected paths supplied from the ACS 152 is shifted successively, and in the process, data corresponding to paths that are not to be selected in terms of the continuity of state transition is discarded. As a result, data corresponding to a survivor path is output from each of the PM(A) 154 and PM(B) 155 as detected data.

Figure 11:
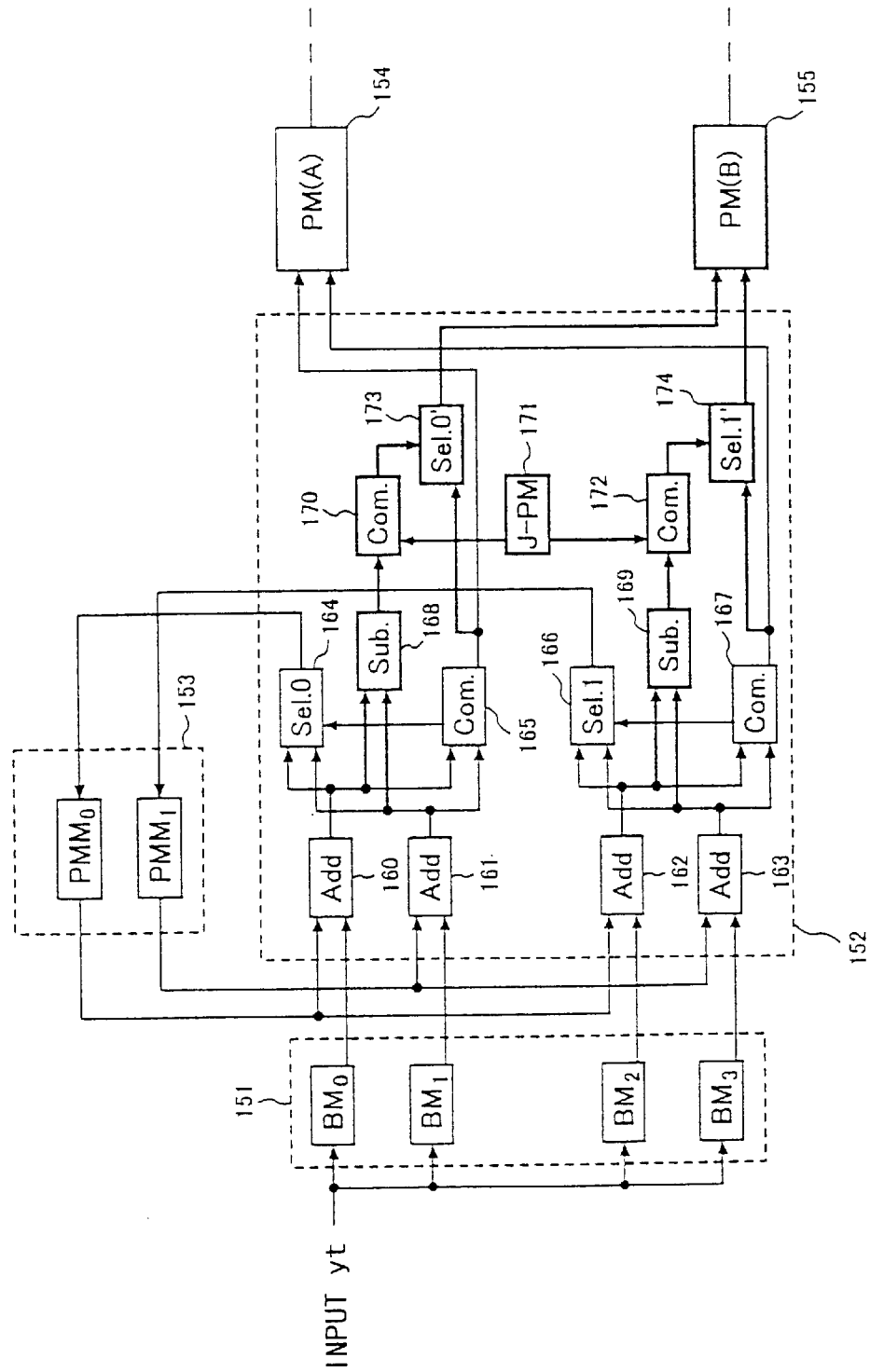
FIG. 11 is a block diagram showing a further detailed structure of the Viterbi detector shown in FIG. 10.

The BM 151, the ACS 152, the PMM 153, the PM(A) 154, and the PM(B) 155 of the Viterbi detector 150 have structures shown in detail in FIG. 11.

In FIG. 11, the BM 151 supplies the calculated BM values BM0 through BM3 to adders 160 through 163 of the ACS 152, respectively. The adder 160 adds the BM value BM0 supplied from the BM 151 and the PM value PM0 supplied from the PMM 153 (PMM0). An addition result (BM0+PM0) of the adder 160 is supplied to a selector 164, a comparator 165, and a subtracter 168. The adder 161 adds the BM value BM1 supplied from the BM 151 and the PM value PM1 supplied from the PMM 153 (PMM1). An addition result (BM1+PM) of the adder 161 is also supplied to the selector 164, comparator 165, and subtracter 168.

The adder 162 adds the BM value BM2 supplied from the BM 151 and the PM value PM0 supplied from the PMM 153 (PMM0). An addition result (BM2+PMM0) of the adder 162 is supplied to a selector 166, a comparator 167, and a subtracter 169. The adder 163 adds the BM value BM3 supplied from the BM 151 and the PM value PM1 supplied from the PMM 153 (PMM1). An addition result (BM3+PM1) of the adder 163 is also supplied to the selector 166, comparator 167, and subtracter 169.

The comparator 165 compares the addition results {(BM0+PM0), (BM1+PM1)} supplied from the adders 160 and 161, respectively, and controls the selector 164 so that the smaller addition result is selected. The addition result selected in the selector 164 is supplied to the PMM 153 as a new PM value PM0. The comparator 167 compares the addition results {(BM2+PM0), (BM3+PM1)} supplied from the adders 162 and 163, respectively, and controls the selector 166 so that the smaller addition result is selected. The addition result selected in the selector 166 is supplied to the PMM 153 as a new PM value PM1. At this time, each of the comparators 165 and 167 supplies the PM(A) with information of 0 or 1 corresponding to the selected path.

The subtracter 168 calculates a difference between the addition results supplied from the adders 160 and 161, respectively {(BM0+PM0)−(BM1+PM1)}, and supplies the difference to a comparator 170. The comparator 170 judges whether or not the difference between the addition results supplied from the subtracter 168 is greater than or equal to the J-PM value supplied from a J-PM generator 171. If the difference between the addition results is greater than or equal to the J-PM value, the comparator 170 controls a selector 173 so that the PM(B) 155 is supplied with the same information as the information 0 or 1 supplied from the comparator 165 to the PM(A) 154. On the other hand, if the difference between the addition results is smaller than the J-PM value, the comparator 170 controls the selector 173 so that the PM(B) 155 is supplied with the opposite information to the information 0 or 1 supplied to the PM(A) 154.

The subtracter 169 calculates a difference between the addition results supplied from the adders 162 and 163, respectively {(BM2+PM0)−(BM3+PM1)}, and supplies the difference to a comparator 172. The comparator 172 judges whether or not the difference between the addition results supplied from the subtracter 169 is greater than or equal to the J-PM value supplied from the J-PM generator 171. If the difference between the addition results is greater than or equal to the J-PM value, the comparator 172 controls a selector 174 so that the PM(B) 155 is supplied with the same information as the information 0 or 1 supplied from the comparator 167 to the PM(A) 154. On the other hand, if the difference between the addition results is smaller than the J-PM value, the comparator 172 controls the selector 174 so that the PM(B) 155 is supplied with the opposite information to the information 0 or 1 supplied to the PM(A) 154.

The Viterbi detector 150 having the above-described structure performs an operation based on the calculations of the expressions (5) through (8) and the calculation results.

Back in FIG. 10, the PM(A) 154 supplies data corresponding to the survivor path to the ideal PR sample generation circuit (A) 156 as the first candidate detected data. The PM(B) 155 supplies data corresponding to the survivor path to the ideal PR sample generation circuit (B) 157 as the second candidate detected data. The ideal PR sample generation circuit (A) 156 generates the first candidate sampled values of ideal PR(1, 1) as shown in FIG. 2 from the supplied first candidate detected data string, and supplies the first candidate sampled values to the actual sample comparison circuit 158.

Figure 2:
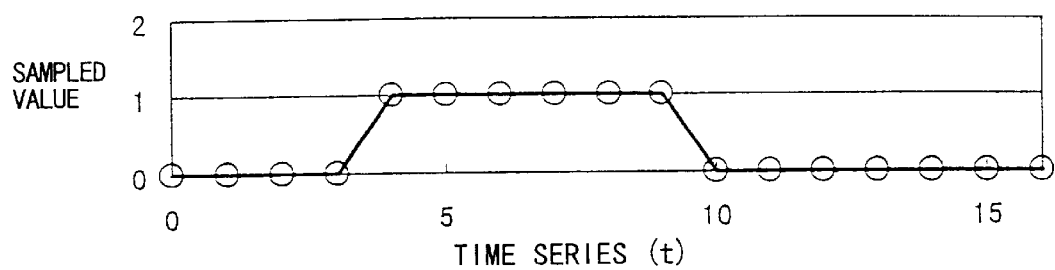
FIG. 2 is a diagram showing sampled values of a reproduced signal complying with PR(1, 1)

The ideal PR sample generation circuit (B) 157 generates the second candidate sampled values of ideal PR(1, 1) as shown in FIG. 2 from the supplied second candidate detected data string, and supplies the second candidate sampled values to the actual sample comparison circuit 158. Sampled values of PR(1, 1)ML can be generated, for instance, by adding data value of a time t and data value of a time t−1.

The actual sample comparison circuit 158 compares each of the first and second candidate sampled values with actual sampled values yt of the reproduced signal from the magneto-optical disk 32. This comparison is made, when the D-PM value is smaller than the J-PM value at a sampled point, with respect to a given length of a sampled point range including the sampled point (hereinafter referred to as a comparison length).

The actual sample comparison circuit 158 selects and outputs, for instance, the first candidate data supplied from the PM(A) 154 which data corresponds to the first candidate sampled values since, normally, (that is, in a state where the D-PM value is greater than or equal to the J-PM value,) the first and second candidate sampled values are equal. Further, when the D-PM value is smaller than the J-PM value at the sampled point as previously described, the actual sample comparison circuit 158 compares the values of each of the first and second sampled value strings within the comparison length including the sampled point with the corresponding sampled values yt of an actual sampled value string (difference value calculation). Then, the actual sample comparison circuit 158 selects and outputs one (a bit string) of the first and second candidate data supplied from the PM(A) 154 and PM(B) 155 which one corresponds to one of the (first and second) candidate sampled value strings which one has the smaller sum of the differences.

Figure 5:
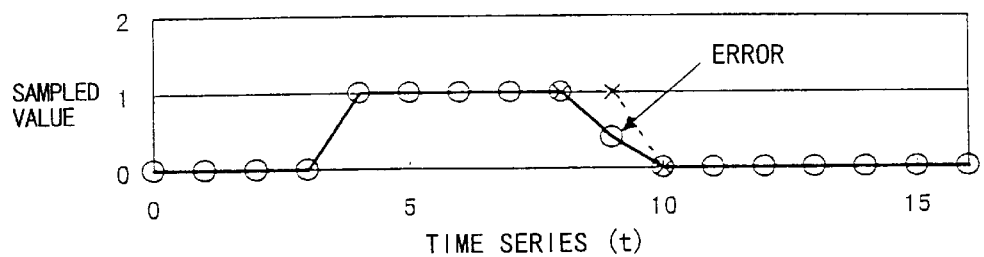
FIG. 5 is a diagram showing sampled values of a reproduced signal complying with PR(1, 1) and affected by a noise.
Figure 6:
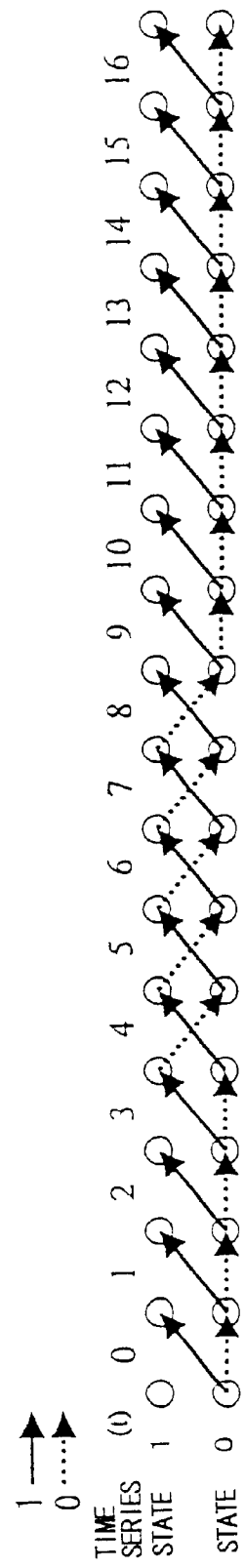
FIG. 6 is a diagram showing a relation between the paths selected in the ACS and the states.
Figure 7:
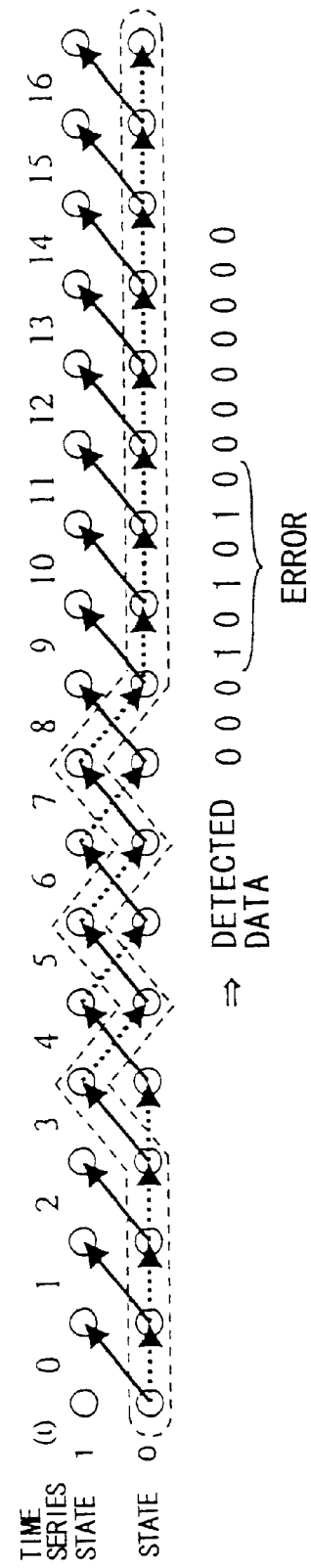
FIG. 7 is a diagram showing a survivor path determined in the PM.

Next, a description will be given further in detail of an operation performed in a case where a reproduced signal as shown in FIG. 5, for instance, is obtained, due to the effect of noise, from the magneto-optical disk 32 recorded with a recording signal obtained by modulating recording data "00001010100000000" including the 1T sequential pattern in accordance with PR(1, 1), and the reproduced signal is input to the Viterbi detector 150 shown in FIG. 10. Here, the J-PM value (path metric judgment value) is set to 0.5 and the comparison length is set to an eight-sampled-point range.

Figure 12:
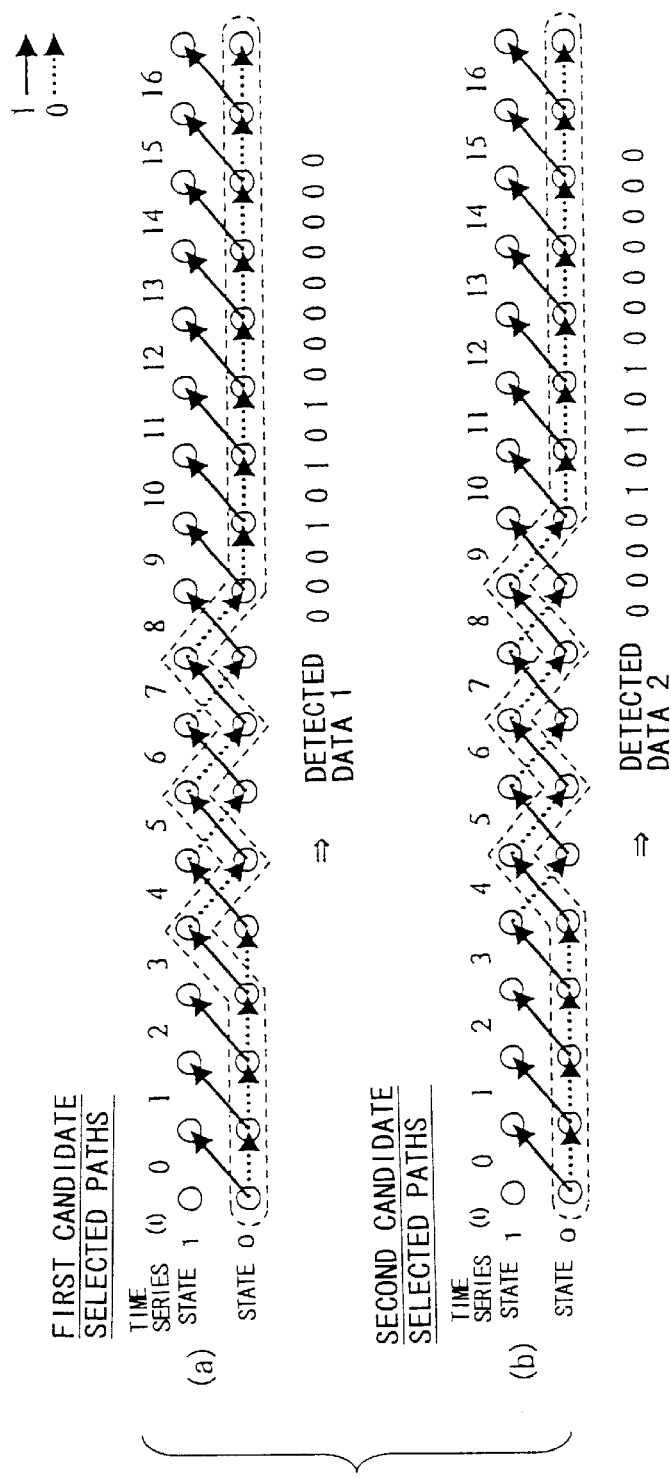
FIG. 12 is a diagram showing a relation between paths selected in an ACS and states.

In the case of inputting sampled values of the reproduced signal changing as shown in FIG. 5 to the Viterbi detector 150, the paths selected in the ACS 152 and states has a relation shown in FIG. 12.

Since each sampled value yt matches its expected value (an ideal sampled value) in (0) through (8) of a time series in a sampled value string of the reproduced signal shown in FIG. 5, the D-PM value is always one. Therefore, as shown in FIG. 12, in (0) through (8) of the time series, the first candidate selected paths (paths to states 0 and 1; see FIG. 12(*a*)) and the second candidate selected paths (paths to states 0 and 1; see FIG. 12(*b*)) obtained in the ACS 152 match.

On the other hand, the sampled value is, for instance, 0.4 at a time (9), so that the D-PM value D-PM0 becomes 0.2 from the above-described expression (7). Since the D-PM value D-PM0 is smaller than the J-PM value (=0.5), the second candidate selected path to state 0 is the opposite of the first candidate selected path to the state 0 as shown in FIG. 12. After a time (10) in the time series, the D-PM is one and, as shown in FIGS. 12(*a*) and 12(*b*), the first and second candidate selected paths match.

The PM(A) 154 and PM(B) 155 successively shift data corresponding to paths selected in the ASC 152 as paths to state 0 and paths to state 1. Then, in the process, data corresponding to paths (paths to state 0 or state 1) that are determined unselected based on the continuity of state transition is discarded, and data corresponding to a survivor path is output from the PM(A) 154 and PM(B) 155 as the first and second candidate detected data, respectively.

As a result of the above-described operation, the PM(A) 154 outputs data "0001010100000000" corresponding to a survivor path enclosed by a dotted line in FIG. 12(*a*) as the first candidate detected data. The PM(B) 155 outputs data "0000101010000000" corresponding to a survivor path enclosed by a dotted line in FIG. 12(*b*) as the second candidate detected data. The first and second candidate detected data differ in the fourth through ninth bits due to a distortion of the reproduced signal at the time (9).

Figure 13:
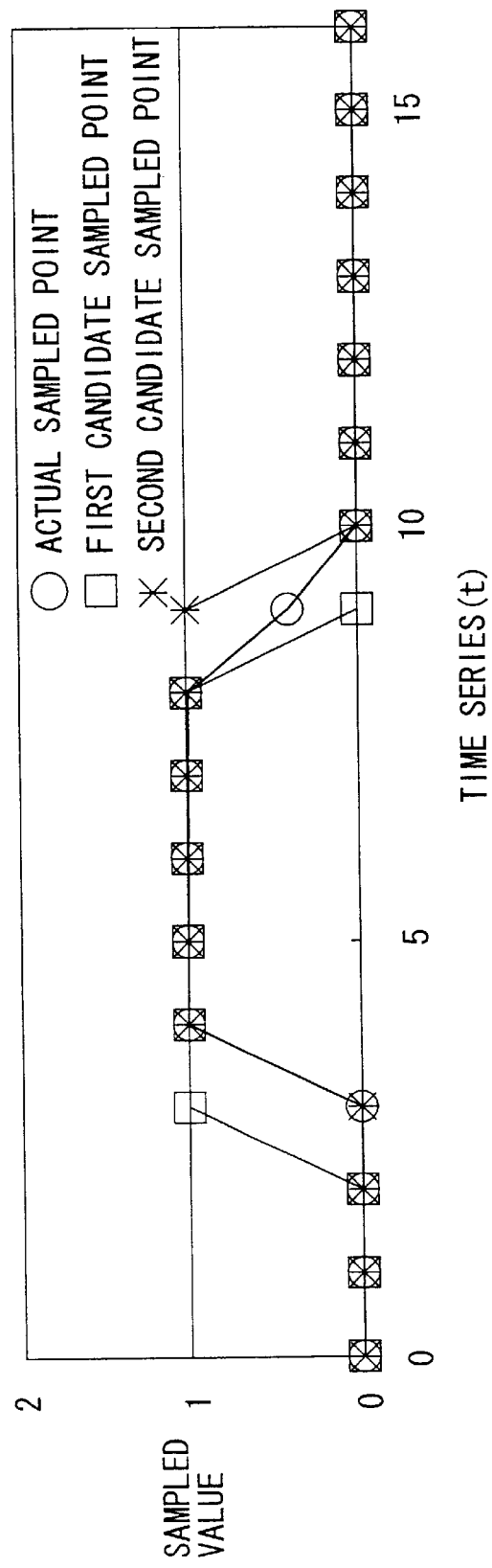
FIG. 13 is a diagram for illustrating an operation of an actual sample comparison circuit.

The ideal PR sample generation circuit (A) 156 generates the first candidate sampled values based on ideal PR(1, 1) from the first candidate detected data output from the PM(A) 154. For instance, the first candidate sampled value string that is "00011111100000000" as indicated by squares in FIG. 13 is generated from the first candidate data string "0001010100000000" supplied from the PM(A) 154 as previously described.

The ideal PR sample generation circuit (B) 157 generates the second candidate sampled values based on ideal PR(1, 1) from the second candidate detected data output from the PM(B) 155. For instance, the second candidate sampled value string that is "00001111110000000" as indicated by asterisks in FIG. 13 is generated from the second candidate data string "0000101010000000" supplied from the PM(B) 155 as previously described.

Normally, the actual sample comparison circuit 158 selects and outputs the first candidate detected data supplied from the PM(A) 154. In a comparison length that is a range covering the time (9) at which the D-PM value becomes 0.2 to be smaller than the J-PM value (=0.5) and the preceding seven sampled points, the actual sample comparison circuit 158 compares each of the first and second candidate sampled values shown in FIG. 13 (marked with squares and asterisks, respectively) with the sampled values yt actually sampled from the reproduced signal obtained from the magneto-optical disk 32 (actual sampled values; marked with circles) (difference value calculation), and calculates the sum of the comparison results (differences). In this case, the sum of differences between the first candidate sampled values and the actual sampled values equals 1.4 (a difference at a time (3) is one, a difference at the time (9) is 0.4, and differences at (2) and (4) through (8) of the rest of the time series are zero), and the sum of differences between the second candidate sampled values and the actual sampled values equals 0.6 (a difference at the time (9) is 0.6 and differences at (2) through (8) of the rest of the time series are zero).

Figure 14:
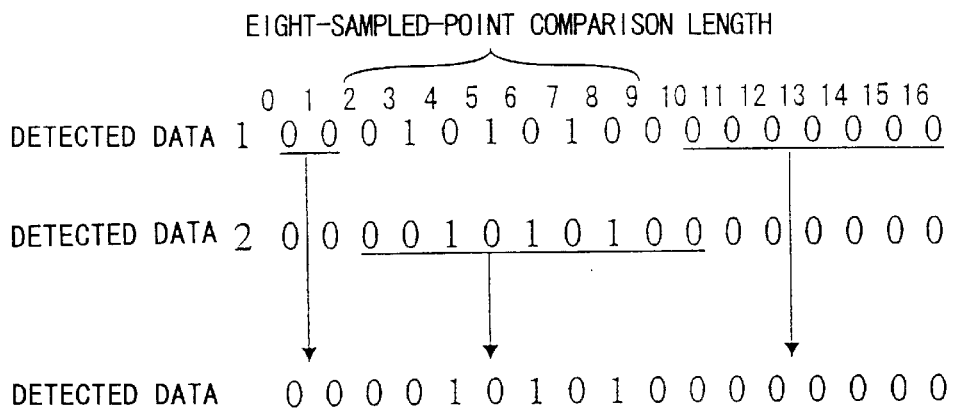
FIG. 14 is a diagram for illustrating an example of selection of detected data.

As a result of the above-described operation, the actual sample comparison circuit 158 determines that the second candidate sampled values are closer to the actual sampled values than the first candidate sampled values in the range covering the time (9) and the preceding seven sampled points ((2) through (9) of the time series). As a result, the actual sample comparison circuit 158 outputs detected data as shown in FIG. 14. That is, the actual sample comparison circuit 158 selects and outputs the first candidate detected data (detected data 1) supplied from the PM(A) 154 which data corresponds to the first candidate sampled values of (0) and (1) of the time series, the second candidate detected data (detected data 2) supplied from the PM(B) 155 which data corresponds to the second candidate sampled values of (2) through (9) of the time series, and the first candidate detected data (detected data 1) supplied from the PM(A) 154 which data corresponds to the first candidate sampled values of (10) through (16) of the time series.

The detected data thus output is "00001010100000000", and matches the original recording data.

Figure 15:
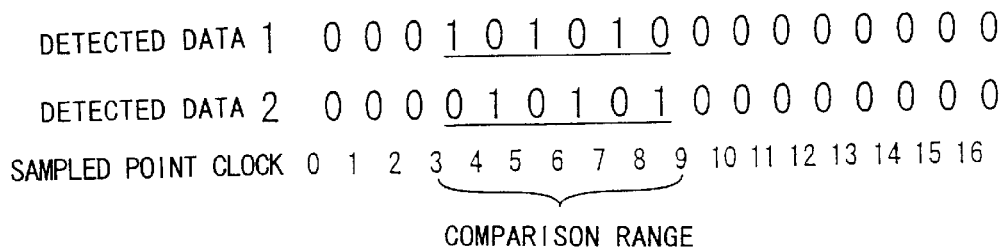
FIG. 15 is a diagram for illustrating another example of selection of detected data.

In the above-described case, in the comparison length that is the range covering the sampled point at which the D-PM value becomes smaller than the J-PM value and the given number of preceding sampled points, each of the first and second candidate sampled values are compared with the actual sampled values, and, based on the comparison results, one of the first and second detected data which one corresponds to whichever candidate sampled values are closer to the actual sampled values is selected as output data. However, as shown in FIG. 15, the same comparison operation as described above and a selection operation of detected data based on the comparison results can be performed in a sampled point range ((3) through (9) of the time series) corresponding to a bit range where the first and second candidate detected data are sequentially different (see underlined parts).

Further, a sampled point range to be subjected to the above-described comparison operation can be determined based on a difference between the first and second candidate sampled value strings (see, for instance, the times (3) and (9) in the case shown in FIG. 13).

Figure 16:
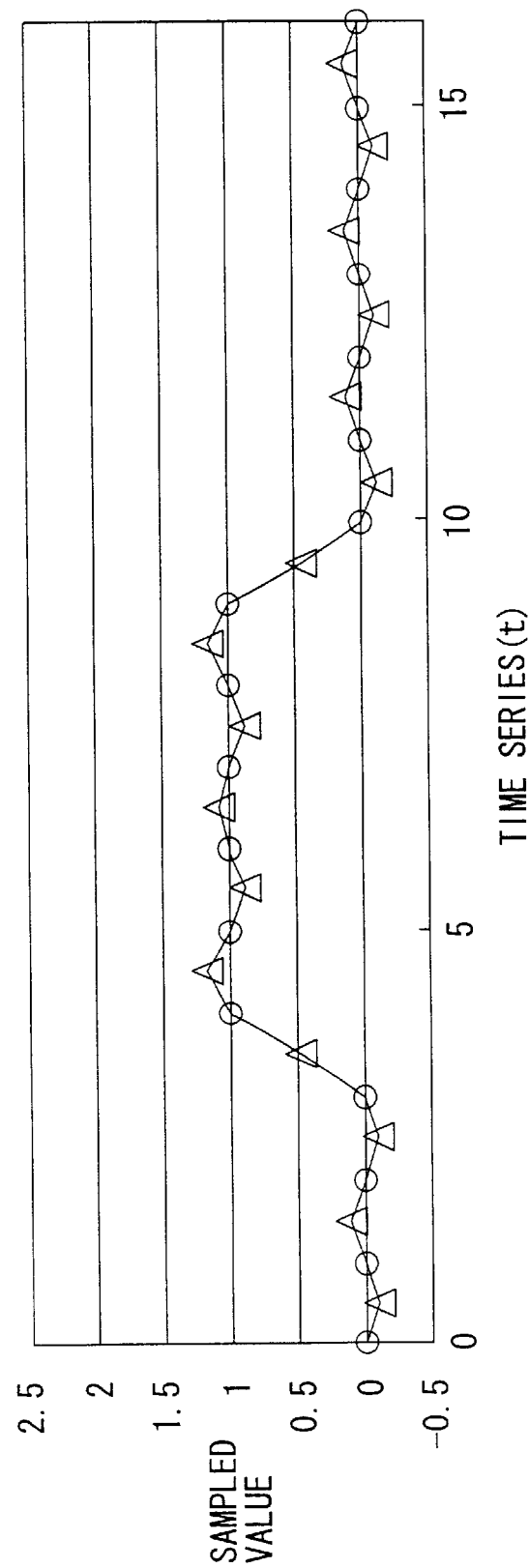
FIG. 16 is a diagram showing sampled values in a case where a sampling frequency is doubled.

Next, a description will be given of an operation in the case of doubling the frequency of a synchronizing clock (a sampling frequency) employed in the analog-to-digital converter 110 shown in FIG. 9. The same applies to a case where the sampling frequency is multiplied by n (n>2). FIG. 16 shows sampled values in a case where a sampling frequency for the reproduced signal is twice that of the above-described case (see, for instance, FIG. 2).

In FIG. 16, the sampled values obtained by sampling an ideal PR(1, 1)ML waveform at the doubled sampling frequency are indicated by "circles" and "triangles". The circles indicate sampled values sampled at the same sampling frequency as that of the above-described case, and the triangles indicate sampled values that are sampled at sampling timings shifted by a half clock cycle from sampling timings for the sampled values indicated by the circles.

The sampled values shown in FIG. 16 are successively input to the Viterbi detector 150. An operation up to the actual sample comparison circuit 158 is equal to that of the above-described case, and a description thereof will be omitted.

Figure 17:
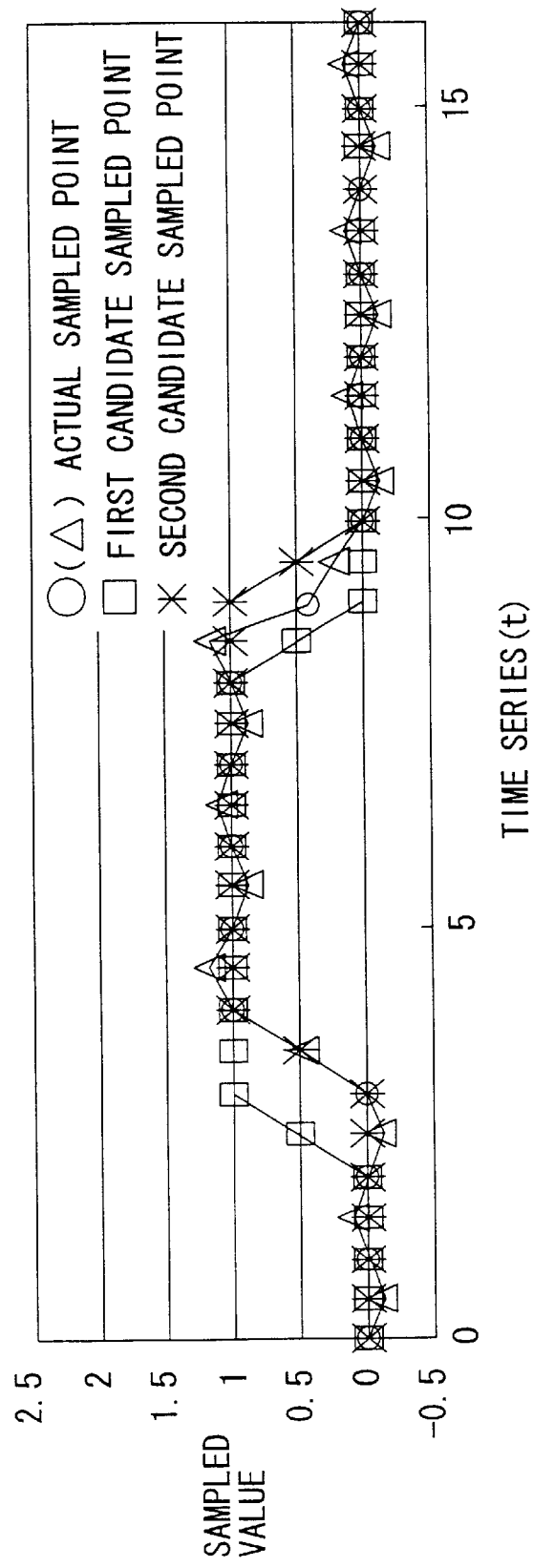
FIG. 17 is a diagram for illustrating an operation of the actual sample comparison circuit in the case where the sampling frequency is doubled.

In the case of inputting to the Viterbi detector 150 shown in FIG. 10 the sampled values of the reproduced signal based on PR(1, 1)ML and affected by a noise as shown in FIG. 5, the actual sample comparison circuit 158, for instance, as shown in FIG. 17, compares each of the first and second candidate sampled values (indicated by squares and asterisks, respectively,) and sampled values yt (actual sampled values) of the reproduced signal from the magneto-optical disk 32.

With reference to the first and second candidate sampled values shown in FIG. 17, a comparison range that is a range where the first and second candidate sampled values are different is (2.5) through (9.5) of a time series. In this comparison range, the sum of the absolute values of differences between the actual sampled values and the first candidate sampled values is 3.9, and the sum of the absolute values of differences between the actual sampled values and the second candidate sampled values is 1.6. Therefore, the actual sample comparison circuit 158 determines that the second candidate sampled values are closer to the actual sampled values than the first candidate sampled values in this comparison range, and selects and outputs the second candidate detected data supplied from the PM(B) 155 corresponding to the second candidate sampled values. Thereby, the Viterbi detector 150 is allowed to correct an error based on the effect of noise.

Next, a description will be given of an application of the present invention to a parallel recording and reproduction method disclosed in Patent Application (Japanese Patent Application No. 11-345499) filed on Dec. 2, 1999 by the applicant of the present application.

Figure 18:
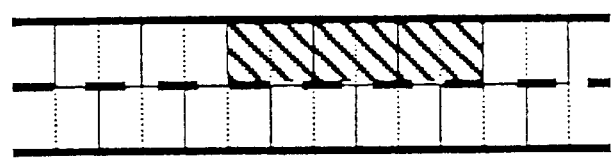
FIG. 18 is a diagram showing a recording pattern by a parallel recording method.
Figure 19:
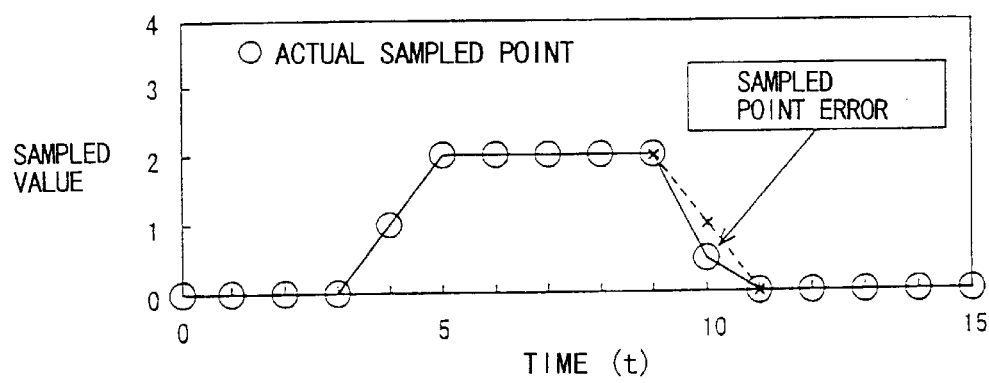
FIG. 19 is a diagram showing sampled values including an error.

By this recording and reproduction method, a signal is written in two rows to each track of a recording medium, and signal reproduction is performed with a single light beam covering each track. For instance, a reproduced signal obtained by projecting a light beam covering two blocks each in vertical and horizontal directions on a recording medium (magneto-optical disk) where a signal is recorded on one side of a track (a hatched part) as shown in FIG. 18 is similar to a reproduced signal with respect to a PR(1, 1) waveform as shown in FIG. 19 (in the case of one-side recording, expected values are 0, 1, and 2). Sampled values indicated by circles in FIG. 19 are obtained by performing sampling on each block.

Data is reproducible from such a reproduced signal similar to PR(1, 1) by using the above-described Viterbi detector 150. A description will be given of the operation with reference to FIG. 19 showing a case where an error is caused in a sampled value at a time (10).

Figure 20:
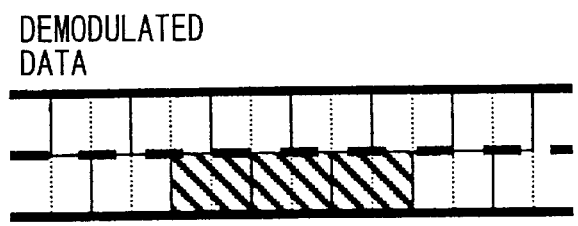
FIG. 20 is a diagram for illustrating detected data demodulated from the sampled values shown in FIG. 19.
Figure 21:
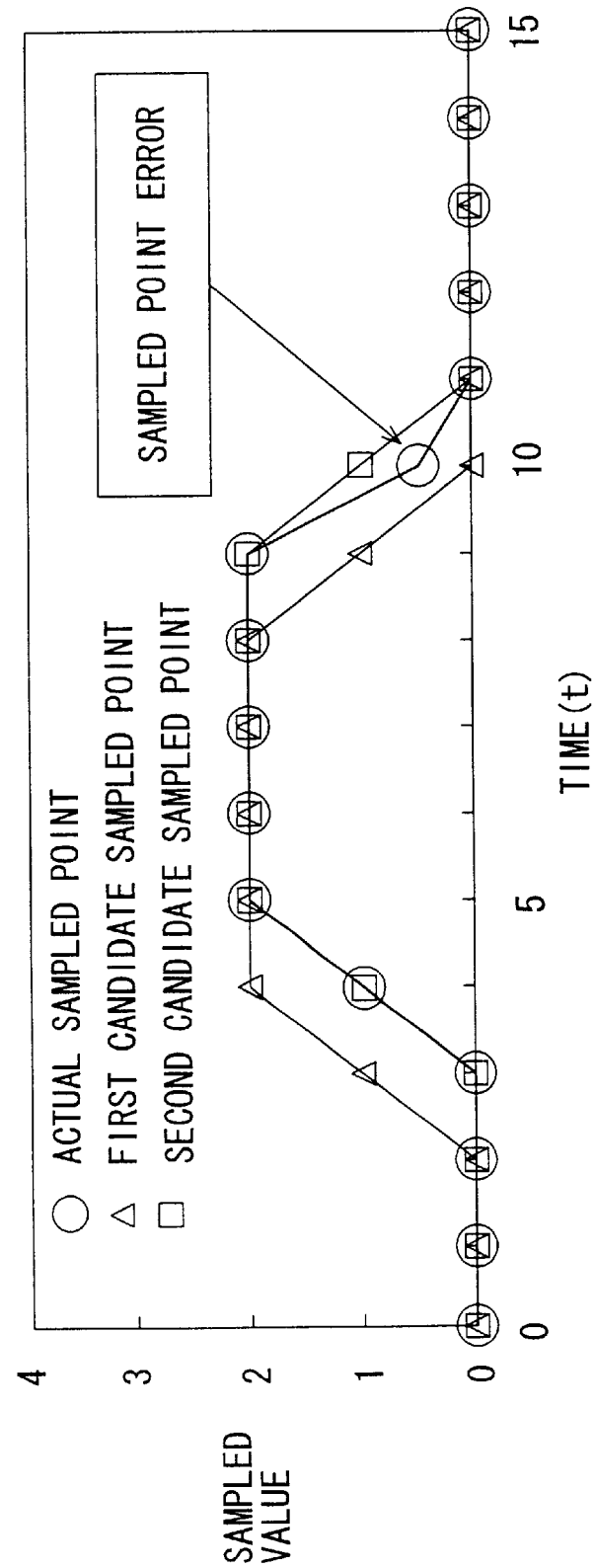
FIG. 21 is a diagram for illustrating an operation of the actual sample comparison circuit.

Due to this error, the first candidate data obtained from the sampled value by the Viterbi decoding corresponds, for instance, to a recording signal that is shifted by one block from the original recording signal (see FIG. 18) as shown in FIG. 20. The second candidate data obtained at that point corresponds to the original recording signal shown in FIG. 18. The first and second candidate sampled values that are ideal sampled points generated from the respective data are indicated by triangles and squares in FIG. 21, respectively.

If the J-PM value is set to 0.5 in this state, a comparison range where the first and second candidate sampled values are different is set to (3) through (10) of a time series at and before the time (10) since the sampled value at the time (10) is 0.45. The actual sample comparison circuit 158 compares each of the first and second candidate sampled values with actual sampled values (see circles in FIG. 21) in the comparison range (difference value calculation). In this case, the second candidate sampled values become smaller than the first candidate sampled values in the sum of difference values. Therefore, the actual sample comparison circuit 158 outputs the second candidate detected data with respect to the comparison range. As a result, the error is corrected.

In the case of reproducing a signal from a recording medium recorded with data by the above-described parallel recording method and reproducing the data from the reproduced signal in accordance with the Viterbi decoding algorithm, no-merge judgment is frequently made, and, therefore, the data reproduction method according to the present invention is especially effective.

The above-described data reproduction apparatus performs not only hard decision of paths based on the magnitudes of PM values but also soft decision employing for detection the second candidate including likelihood. Therefore, the above-described data reproduction apparatus has a high detection capability and can reproduce data correctly even if an S/N is low at a time of signal reproduction.

Next, a description will be given of another embodiment of the present invention.

As previously described, the ACS 152 selects the smaller of two PM values corresponding to two paths (see expressions (5) and (6)). A smaller difference between the selected PM value and unselected PM value (differential path metric value D-PM value; see expressions (7) and (8)) means that the paths corresponding to those PM values are closer in the degree of likelihood, so that it can be inferred that the selected path is probably wrong. Therefore, the ACS 152 compares the magnitudes of the D-PM value and the given PM judgment value (J-PM value). If the D-PM value is greater than or equal to the J-PM value, the two paths are definitely different in likelihood so that the ACS 152 judges that the selected PM value is reasonable. On the other hand, if the D-PM value is smaller than the J-PM value, the two paths are only slightly different in likelihood so that the reasonability of the selected PM value is doubtful.

For the above-described reason, in this embodiment, if a difference in likelihood between two paths (reliability) is small, candidate data determined from a selected path and another candidate data are generated, as in the above-described embodiment, to be subjected to a parity check. Then, the candidate data which, the results of the parity check show, includes no error is output as final data.

Figure 22:
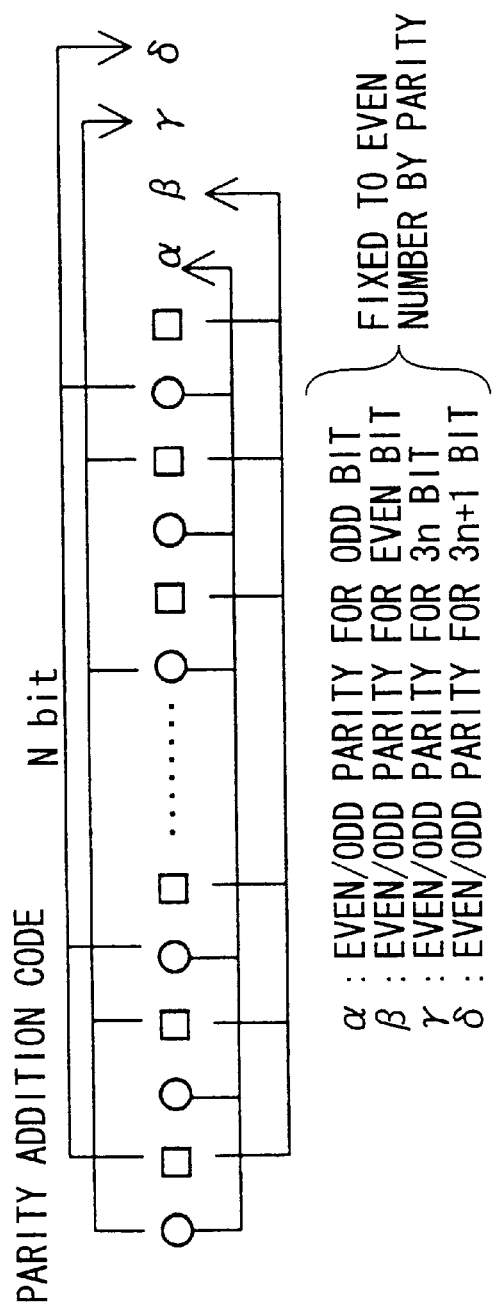
FIG. 22 is a diagram showing an addition code of parity information.

Parity bits (parity information $P_k$) are added to data to be recorded in accordance with, for instance, an addition code shown in FIG. 22. Such data with the parity bits is modulated in accordance with a PR waveform to be written to a magneto-optical disk. Then, reproduced data is generated from a reproduced signal from the magneto-optical disk by an ML technique (by a Viterbi detector).

In FIG. 22, four bits α, β, γ, and δ are added to each N bits of data to be recorded as parity bits (parity information $P_k$). The value (0 or 1) of each parity bit is defined in the following manner.

The value of α is defined as an even/odd parity for the odd bit string (see circles) of N-bit data. The value of β is defined as an even/odd parity for the even bit string (see squares) of the N-bit data. The value of γ is defined as an even/odd parity for the bit string of 3nth bits of the N-bit data. The value of δ is defined as an even/odd parity for the bit string of (3n+1)th bits of the N-bit data.

By the above-described parity bit addition code, an error that occurs as a mass in N bits and has a sequential error length of 6 bits or less can be detected.

Each error starts with a 6nth, (6n+1)th, (6n+2)th, (6n+3) th, (6n+4)th, or (6n+5)th bit position. The error length (bit length) of each error is classified as 0, 1, 2, 3, 4, 5, 6, or 7 and over. In this way of thinking, a case where a transmitted parity does not match the parity of demodulated data due to a transmission error is shown by each X in FIG. 23. That is, since an error of an error length of 6 bits or less has at least on of the four bits (α, β, γ, and δ) unmatched, the presence or absence of an error can be determined by such 4-bit parity information.

Figure 24:
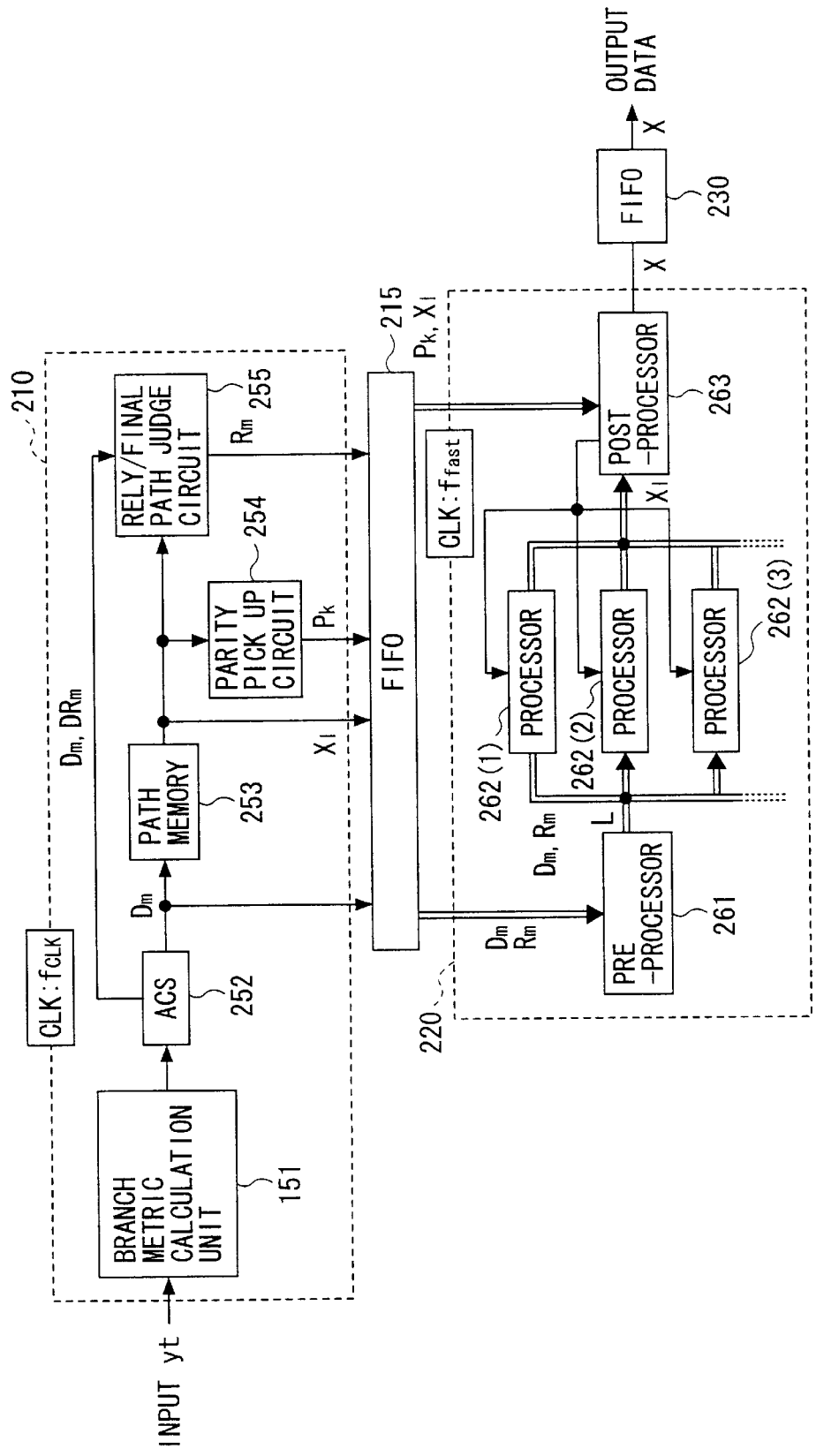
FIG. 24 is a block diagram showing another structure of the Viterbi detector.

A Viterbi detector reproducing data based on a reproduced signal obtained from a magneto-optical disk on which the data having parity bits (parity information $P_k$) added thereto in accordance with such an addition code as described above is PR(1, 1)-modulated to be recorded has a structure shown in FIG. 24.

In FIG. 24, the Viterbi detector includes a basic information generation circuit 210, a FIFO (First-In-First-Out) memory 215, and a processing circuit 220. The basic information generation circuit 210 operates in synchronism with the same synchronizing clock (CLK: $f_{CLK}$) as the synchronizing clock (sampling clock) employed in the analog-to-digital converter 110 (see FIG. 9). A variety of basic information generated in the basic information generation circuit 210, which basic information is later described, is supplied to the processing circuit via the FIFO memory 215. The processing circuit 220 generates final detected data based on the basic information accumulated in the FIFO memory 215. The processing circuit 220 performs the operation in synchronism with a (faster) clock of a shorter cycle (CLK: $f_{fast}$) than the synchronizing clock for the basic information generation circuit 210. Thereby, an operation delay in the processing circuit 220 is minimized.

The basic information generation circuit 210 includes the BM (branch metric calculation unit) 151, an ACS (Add Compare Select unit) 252, and a PM (path memory 1) 253. A PMM (path metric memory) is omitted in FIG. 24 although the PMM is actually included as in the structure shown in FIG. 10.

The basic information generation circuit 210 further includes a parity pick up circuit 254 and a rely/final path judge circuit 255.

The ACS 252, as in the above-described embodiment, selects one of two paths to a state (state 1 or state 0) which one has the smaller corresponding PM value (path metric value). That is, in $$PM_m = \min\{PM_i + BM_j, PM_k + BM_l\},$$

a selected path $D_m = 1$ is output if the former in the brackets { } is selected, and a selected path $D_m = 0$ is output if the latter in the brackets { } is selected.

Further, the ACS 252 calculates a difference (D-PM value) between the PM values corresponding to the respective paths, and calculates a difference between the D-PM value and a given PM judgment value (path metric judgment value: J-PM value). Then, the ACS 252, based on the difference, defines a reliability $DR_m$ as follows:

If $|PM_i + BM_j - PM_k + BM_l| < J\text{-}PM$, $DR_m = 0$.

If $|PM_i + BM_j - PM_k + BM_l| \geq J\text{-}PM$, $DR_m = 1$.

That is, if the difference between the two PM values is smaller than the J-PM value, it is determined that the reliability of a path selected based on the PM values is relatively low, so that the reliability $DR_m$ is set to "0" ($DR_m = 0$). On the other hand, if the difference between the two PM values is greater than or equal to the J-PM value, it is determined that the reliability of a path selected based on the PM values is relatively high, so that the reliability $DR_m$ is set to "1" ($DR_m = 1$).

The ACS 252, as in the above-described embodiment, successively supplies the above-described selected paths $D_m$ to the path memory 253 and the rely/final path judge circuit 255, and to the FIFO (First In First Out) memory 215 as basic information. Further, the ACS 252 supplies the above-described reliabilities $DR_m$ to the rely/final path judge circuit 255.

The path memory 253, as in the above-described embodiment, successively shifts the selected paths $D_m$ (binary data) supplied successively from the ACS 252, and in the process, discards data corresponding to paths determined unselected based on the continuity of state transition. Then, the path memory 253 outputs data corresponding to a survivor path as the first candidate data (x1). The first candidate data (x1) is supplied to the parity pick up circuit 254 and the rely/final path judge circuit 255, and to the FIFO memory as basic information.

The parity pick up circuit 254 identifies, from the first candidate data x1 supplied from the path memory 253, the parity information $P_k$ added to the first candidate data x1 in accordance with the above-described addition code (addition of α, β, γ, and δ to each N bits), and supplies the parity information $P_k$ to the FIFO memory 215 as basic information. The rely/final path judge circuit 255 determines a final selected path $DX_m$ corresponding to the first candidate data x1 supplied from the path memory 253. Then, the rely/final path judge circuit 255 outputs, to the FIFO memory 215 as basic information, a reverse candidate $R_m$ representing the position of a path whose reliability $DR_m$ is "0" (low reliability) in the final selected path $DX_m$. Specifically, the reverse candidate $R_m$ is bit information provided with respect to each path in the final selected path $DX_m$. Bits corresponding to paths whose reliability $DR_m$ is "0" are 1 ($R_m = 1$) and the other bits are 0 ($R_m = 0$) (hereinafter, if necessary, $R_m = 1$ is referred to simply as a reverse candidate).

The FIFO memory 215 stores, as basic information, the selected paths $D_m$, reverse candidates $R_m$, first candidate data x1, and parity information $P_k$ for N bits supplied from the basic information generation circuit 210 as described above.

The processing circuit 220 includes a pre-processor 261, a plurality of processors 262(1), 262(2), 262(3), . . . 262(K)

(whose number is K), and a post-processor 263. The processors are collectively referred to by the reference numeral 262.

The pre-processor 261 obtains the selected paths $D_m$ and reverse candidates $R_m$ from the FIFO memory 215. Then, the pre-processor 261 sets the number of times I a computation is performed based on the number of the reverse candidates $R_m$ ($R_m$=1) and provides the reverse candidates $R_m$ with order labels (L).

$$I=\Sigma R_m(t) \ (t: t\sim t+N, m: 0\sim 3)$$

$$L=1\sim I$$

Then, the pre-processor 261 distributes sets of each reverse candidate $R_m$ (representing a position where the reliability $DR_m$=0 in the final selected path $DX_m$) and the selected paths $D_m$ to the processors 262 in accordance with the order of the labels L. If the number of the reverse candidates $R_m$ is greater than the number of the processors 262, that is, K, the reverse candidates $R_m$ and the selected paths $D_m$ (corresponding to the label 1 through K) are distributed to all the processors 262(1) through 262(K), and after each processor 262 terminates a later-described computation, the reverse candidates $R_m$ and the selected paths $D_m$ corresponding to the rest of the labels (K+1 through I) are distributed to the corresponding processors 262.

Figure 3:
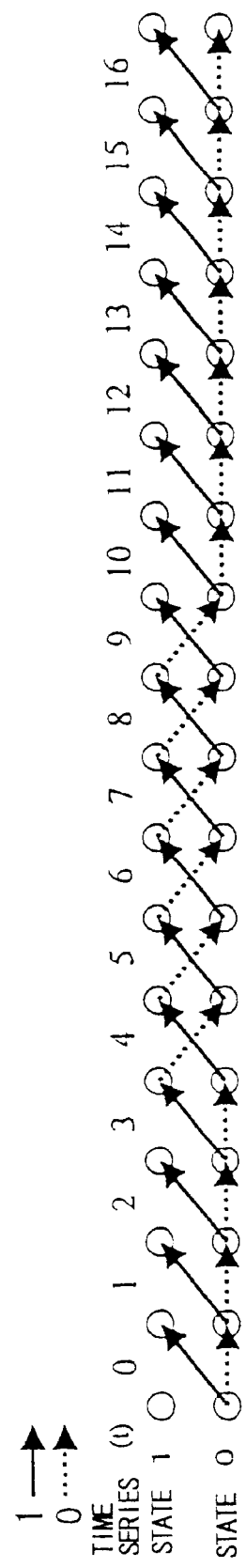
FIG. 3 is a diagram showing a relation between paths selected in an ACS and states.
Figure 4:
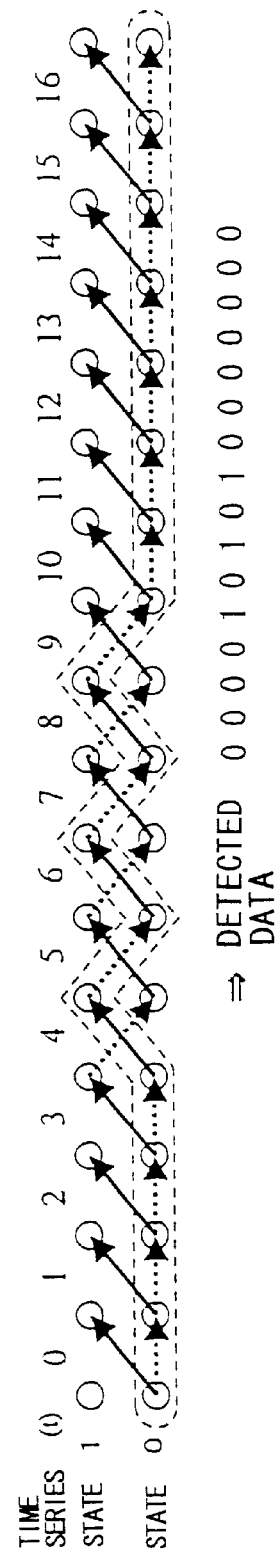
FIG. 4 is a diagram showing a survivor path determined in a PM.

Each processor 262 includes a processing part and a path memory 2 that has the same function as the path memory 253. The ACS 152 selects two transition paths to states 1 and 0, respectively, at each time, and outputs the transition paths as selected paths $D_m$ (see, for instance, FIG. 3). The processing part of each processor 262 changes one of the selected paths $D_m$ that corresponds to a reverse candidate $R_m$ of the final selected path $DX_m$ to a path representing transition state different from that represented by the one of the selected paths $D_m$ corresponding to the reverse candidate $R_m$. The selected paths $D_m$ having the one corresponding to the reverse candidate $R_m$ changed are supplied to the path memory 2. The path memory 2, in the process of successively shifting the supplied selected paths $D_m$, discards data corresponding to paths determined unselected based on the continuity of state transition. Then, the path memory 2 outputs data corresponding to a survivor path as the ith candidate data (x2i).

As described above, each processor 262 generates candidate data based on selected paths having a low-reliability path changed. Then, the first candidate data (x1) (for the N bits) and the parity information $P_k$ (the values of α, β, γ, and δ) as well as the ith candidate data (x2i) computed in each processor 262 are input to the post-processor 263. The post-processor 263 successively computes, from the first and other candidate data (x1 and x2i), the values $P_k$–1 (corresponding to the first candidate data x1) and $P_k$–2I (corresponding to the ith candidate data x2i) of the parity information (α, β, γ, and δ) added to the first and ith candidate data x1 and x2i in accordance with the above-described addition code.

In the computation process, if the parity information value $P_k$–1 computed for the first candidate (x1) satisfies $$P_k=P_k-1,$$

the post-processor 263 outputs the first candidate data (x1) as a final detection result (x), and outputs to each processor 262 a control signal to end the computation (E=1) (first case).

If the parity information value $P_k$–2i computed for the ith candidate data (x2i) satisfies $$P_k=P_k-2i,$$

the post-processor 263 outputs the ith candidate data (x2i) as the final detection result (x), and outputs to each processor 262 a control signal to end the computation (E=1) (second case).

Further, in the process of computing a parity information value for each candidate data, if a parity information value ($P_k$–1 or $P_k$–2i) computed for the candidate data is different from the parity information $P_k$ stored in the FIFO memory 215, the post-processor 263 instructs each processor 262 to continue the computation. After the computation is performed the number of times I set as described above, the post-processor 263 outputs the first candidate data (x1) as the final detection result (x) (third case).

As previously described, the Viterbi detector of this embodiment performs the parity check on each of the N-bit first candidate data (x1) obtained directly from the sampled values of the reproduced signal and the N-bit ith candidate data generated from the selected paths obtained by reversing the values ($D_m$) of the low-reliability ($DR_m$=0) ones of the selected paths corresponding to the first candidate data (x1). Then, one of the N-bit candidate data which one is determined correct as a result of the parity check is output as the final detection result (x). The output N-bit final detection results are successively accumulated in the FIFO memory 230 to be joined, and the joined bit strings are successively output as detected data.

If no candidate data is determined correct as a result of the above-described parity check, the first candidate data (x1) is output as the final detection result (x) (the above-described third case), thereby preventing the output of wrong data resulting from the above-described operation.

In the above-described embodiment, the ith candidate data x2i is generated from the selected paths obtained by changing a path with a reverse candidate $R_m$ (low-reliability path) of the selected paths $D_m$. However, candidate data may be generated from selected paths obtained by changing a plurality of reverse candidate paths, that is, by reversing two, three, or all reverse candidate paths.

Here, a parity check is employed as a technique to determine the correctness of each candidate data, but the correctness of each candidate data can be determined by the technique of ECC (Error Correcting Code).

Further, a description will be given of a specific operation. For instance, data of "0000111110000" (13 bits) is PR(1, 1)-modulated to be recorded on a magneto-optical disk. A description will be given of a demodulation operation of the above-described Viterbi detector in a case where sampled values (circles) of a reproduced signal shown in FIG. 25, for instance, are obtained from the magneto-optical disk. In this case, a sample error is caused at a time (t=9).

Figure 25:
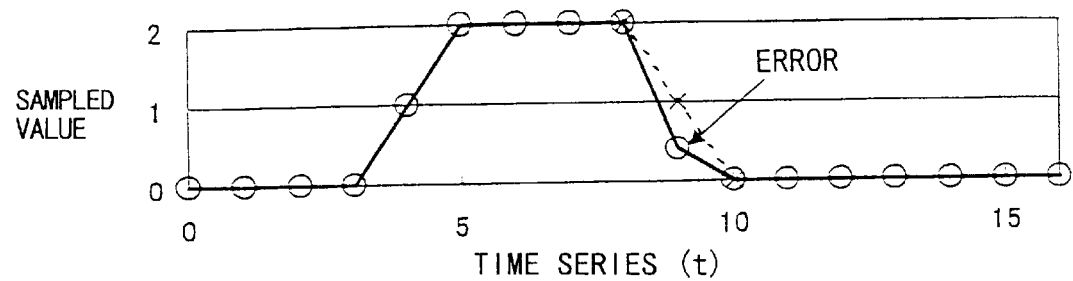
FIG. 25 is a diagram showing sampling of a reproduced signal.

Branch metric values calculated from the sampled values shown in FIG. 25 are input to the ACS 252, which outputs, for instance, selected paths $D_m$ shown in FIG. 26(a). With respect to the selected paths $D_m$, the sampled values conform to an ideal PR waveform up to a time (t=8). Therefore, if the J-PM value (path metric judgment value) is set to "0.5", it is determined that a final selected path has high reliabilities ($DR_m$=1) up to the time (t=8).

A sampled value at the time (t=9) is "0.4". Therefore, the D-PM value that is a difference between PM values with respect to the sampled value becomes "0.2", which is smaller than the J-PM value (=0.5). Therefore, it is determined that path reliability at the time (t=9) is low ($DR_m$=0).

The final selected path selected in the path memory 253 in this state is obtained as indicated by a bold arrow in FIG. 26(b). The first candidate data x1 corresponding to the final selected path is "0000111100000" (different from the recorded data "0000111110000").

Figure 26:
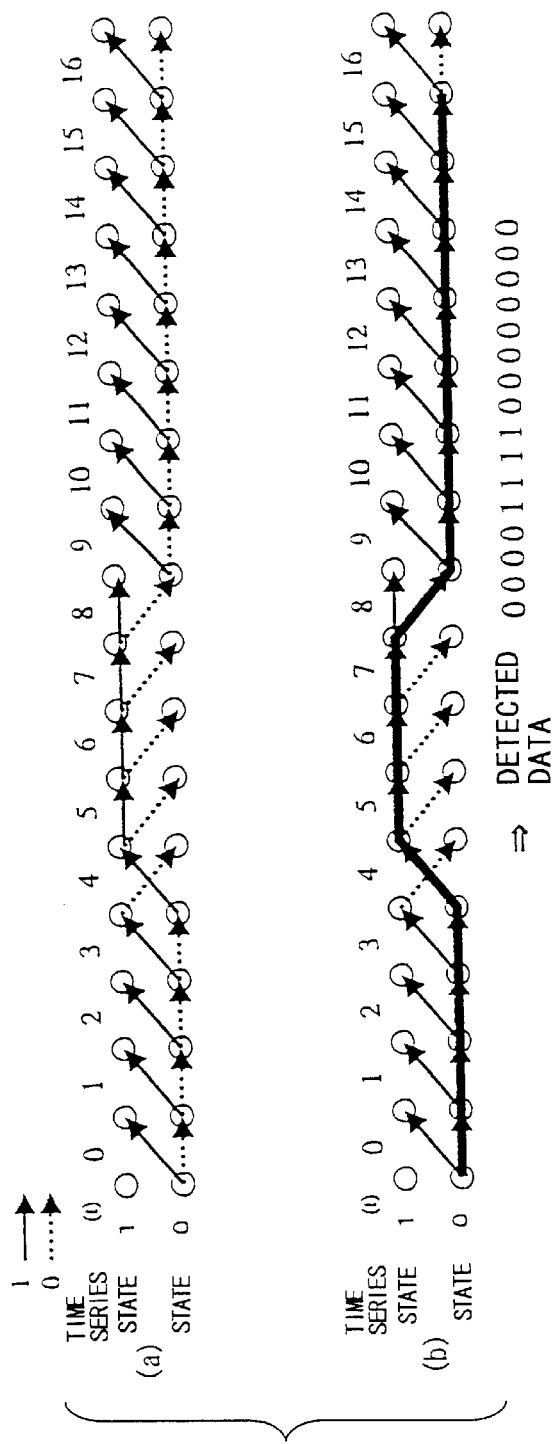
FIG. 26 is a diagram showing selected paths obtained from sampled values shown in FIG. 25, a final selected path obtained from the selected paths, and detection data corresponding thereto.
Figure 27:
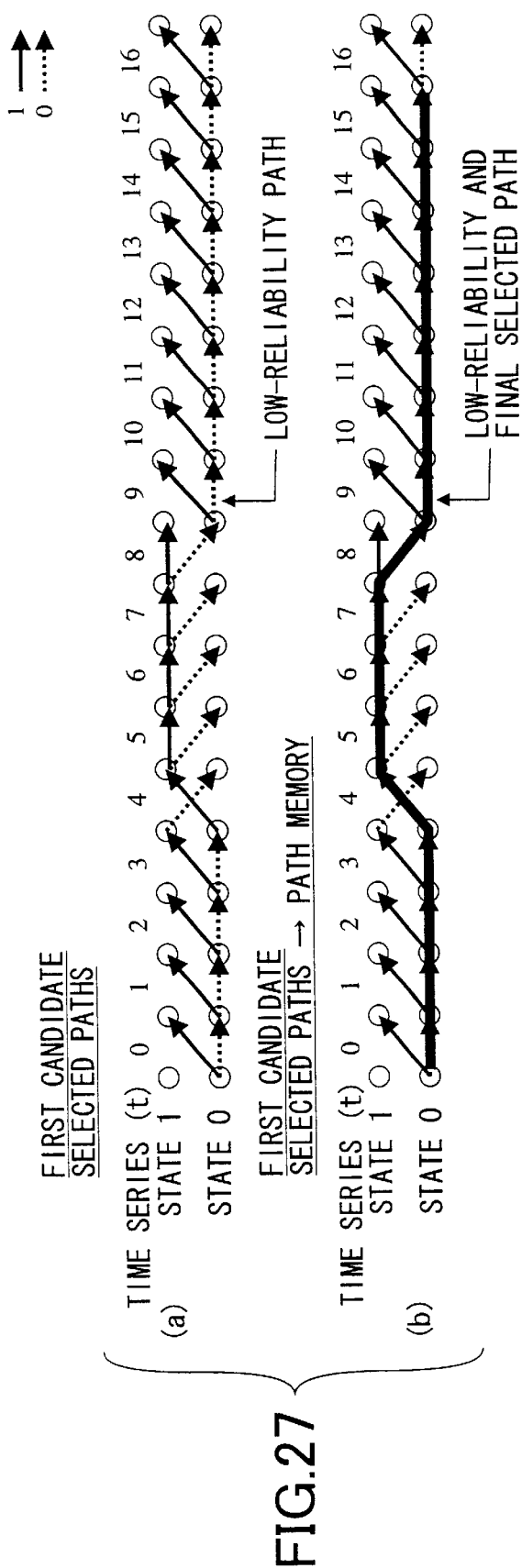
FIG. 27 is a diagram showing low-reliability paths in the selected paths and the final selected path shown in FIG. 26.

As a result of the above-described computation results of the reliabilities $DR_m$, it is recognized that, as shown in FIG. 27(a), of the selected paths $D_m$ obtained in the ACS 252 (the first candidate selected paths: the same as those in FIG. 26(a)), a transition path from state 0 to 1 at the time (t=9) (solid arrow) and a transition path from state 0 to 0 at the time (t=9) (dotted arrow) each have a low reliability ($DR_m$=0). Of these low-reliability paths, the transition path from state 0 to 0 at the time (t=9) of the final selected path indicated by a bold arrow in FIG. 27(b) (the same as that in FIG. 26) is selected as a reverse candidate ($R_m$=1).

The pre-processor 261 supplied with the selected paths $D_m$ shown in FIG. 27(a) and the reverse candidate $R_m$ supplies the selected paths $D_m$ and reverse candidate $R_m$ to, for instance, the processor 262(1). The processing part of the processor 262(1) changes the reverse candidate transition path from state 0 to 0 at the time (t=9) of the selected paths $D_m$ to a transition path from state 1 to 0 (dotted arrow), and obtains the selected paths $D_m$ shown in FIG. 28(a). The selected paths $D_m$ are successively supplied to the path memory 2 in the processor 262(1). The path memory 2 obtains the second candidate data x2 of "0000111110000" corresponding to a final selected path indicated by a bold arrow in FIG. 28(b).

The post-processor performs a parity check on the first and second candidate data x1 and x2.

Parity information added to the recording data "0000111110000" is "1100" (α, β, γ, and δ) according to the above-described addition code (see FIGS. 22 and 23). If no error is caused at any timings other than the time t=9 as in the above-described case, the parity information $P_k$ detected from the data x1 output from the path memory 253 in the parity pick up circuit 254 is "1100". Under these conditions, the post-processor 263 computes parity information $P_k$-1 of "0100" from the first candidate data x1 of

0000111100000, and parity information $P_k$-2 of "1100" from the second candidate data x2 of

0000111110000.

In this case, $P_k$=$P_k$-2 (the above-described second case), and the post-processor 263 outputs the second candidate data as the final detection result x.

The second candidate data x2 is identical to the original recording data. Therefore, if an error is caused during sampling a reproduced signal as shown in FIG. 25, data identical to original recording data can properly be reproduced.

With respect to the above-described demodulation operation, the description is given of the case where no error is caused in sampled values corresponding to the parity bits (parity information $P_k$) added to the recording data. Actually, such an error can be caused, but there is little possibility that the parity information extracted from the reproduced data (x1) matches parity information computed from other candidate data. Therefore, the computation is performed the above-described number of times I without detecting such a matching of parity information (the above-described third case). In this case, the first candidate data obtained directly from the sampled values is output as the final detection result. If an error is limited only to the parity bits, nothing is wrong with this result in particular.

Further, since the system, in itself, achieves good data reproduction accuracy by employing the PRML technique, a probability that errors occur simultaneously in the parity bits and other bits is extremely small, causing no special problem.

In each of the above-described embodiments, the subtracters 168 and 169 shown in FIG. 11 and the function of the ACS 252 shown in FIG. 24 correspond to difference value calculation means, the comparators 170 and 172 shown in FIG. 11, the J-PM generator 171 shown in FIG. 11, the selectors 173 and 174 shown in FIG. 11, the function of computing a reliability $DR_m$ in the ACS 252 shown in FIG. 24, the function of computing a reverse candidate $R_m$ in the rely/final path judge circuit 255 shown in FIG. 24, and the processing part of each processor 262 shown in FIG. 24 correspond to alternative path selection means. The PMs 154 and 155 shown in FIG. 11, the ideal PR sample generation circuits 156 and 157, the actual sample comparison circuit 158, and the function of the path memory 2 and the post-processor 263 of each processor 262 shown in FIG. 24 correspond to reproduced data determination means.

The comparators 170 and 172 shown in FIG. 11 and the function of computing a reliability $DR_m$ in the ACS 252 shown in FIG. 24 correspond to judgment means.

Figure 1:
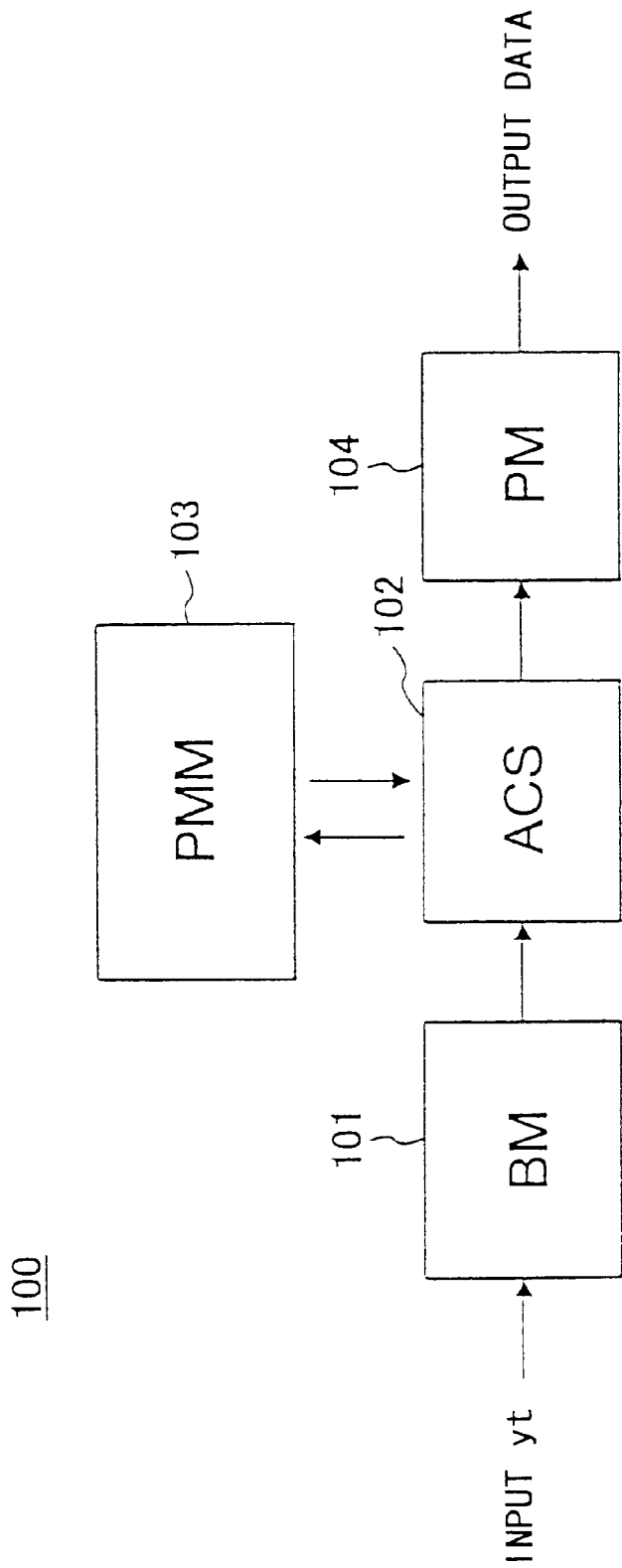
FIG. 1 is a block diagram of a Viterbi detector.

The PM 154 shown in FIG. 11 and the path memory 253 shown in FIG. 24 correspond to first candidate data generation means, the PM 155 shown in FIG. 11 and the path memory of each processor 262 shown in FIG. 24 correspond to second candidate data generation means, and the ideal PR sample generation circuits 156 and 157 shown in FIG. 1, the actual sample comparison circuit 158 shown in FIG. 11 and the post-processor 263 shown in FIG. 24 correspond to data selection means.

The ideal PR sample generation circuit 156 shown in FIG. 11 corresponds to first sampled value generation means, the ideal PR sample generation circuit 157 corresponds to second sampled value generation means, and the actual sample comparison circuit 158 corresponds to actual sampled value judgment means.

The FIFO memory 215 shown in FIG. 24 corresponds to a memory unit.

As previously describe, according to the present invention, data to be reproduced is determined in consideration of both paths selected in accordance with the above-described given rule and alternative paths selected based on differences between path metric values which differences can represent the reliabilities of the selected paths. Therefore, a data reproduction apparatus having a high data detection capability and good noise immunity can be realized.

What is claimed is:

1. A data reproduction apparatus sampling at a given rate a reproduced signal complying with a partial response waveform, calculating branch metric values in accordance with the Viterbi decoding algorithm by employing expected values defined by the partial response waveform and each of sampled values, calculating path metric values based on the branch metric values, selecting paths corresponding to data state transition in accordance with a given rule based on comparison results of the path metric values, and reproducing data based on the selected paths, the reproduced signal being obtained from a recording medium, the data reproduction apparatus comprising:

difference value calculation means for calculating a difference between compared ones of the path metric values in selecting a corresponding one of the paths;

alternative path selection means for selecting a path different from the corresponding one of the paths, which are selected in accordance with the given rule, as an alternative path based on the difference between the compared ones of the path metric values calculated in said difference value calculation means; and reproduced data determination means for determining data to be reproduced based on the paths selected in accordance with the given rule and the alternative path selected in said alternative path selection means.

2. A data reproduction apparatus as claimed in claim 1, wherein:

said alternative path selection means comprises judgment means for judging whether the difference between the compared ones of the path metric values is smaller than a predetermined value; and the alternative path is selected if said judgment means judges that the difference between the compared ones of the path metric values is smaller than the predetermined value.

3. The data reproduction apparatus as claimed in claim 1 or 2, wherein:

said reproduced data determination means comprises:
first candidate data generation means for generating a first candidate data string corresponding to a first path string selected in accordance with the given rule;
second candidate data generation means for generating a second candidate data string corresponding to a second path string obtained by changing a path of the first path string, the path corresponding to the alternative path selected in said alternative path selection means; and
data selection means for selecting one of the first and second candidate data strings based on a given criterion for likelihood; and the first or second candidate data string selected in said data selection means is determined as the data to be reproduced.

4. The data reproduction apparatus as claimed in claim 3, wherein:

said data selection means comprises:
first sampled value generation means for generating a first candidate sampled value string from the first candidate data string based on a characteristic of the partial response waveform;
second sampled value generation means for generating a second candidate sampled value string from the second candidate data string based on the characteristic of the partial response waveform; and
actual sampled value judgment means for judging which of the first or second candidate sampled value string is closer to a sampled value string obtained from the reproduced signal; and
one of the first and second candidate data strings is selected as a data string with more likelihood, the one corresponding to one of the first and second candidate sampled value strings judged closer to the sampled value string obtained from the reproduced signal in said sampled value judgment means.

5. The data reproduction apparatus as claimed in claim 3 or 4, wherein the first candidate data string is obtained based on the first path string set in a given range in a string of the paths selected in accordance with the given rule, the given range including the path corresponding to the alternative path.

6. The data reproduction apparatus as claimed in claim 5, wherein the first candidate data string is obtained based on the first path string at a timing when the difference between the compared ones of the path metric values reaches the value for selecting the alternative path in a process of selecting the paths in accordance with the given rule, the first path string continuing up to the timing for a given period of time.

7. The data reproduction apparatus as claimed in claim 3, wherein:

said first candidate data generation means generates the first candidate data string of a given length;
said second candidate data generation means generates the second candidate data string of the given length; and
said data selection means performs error detection on the first and second candidate data strings by employing a given error detection technique, and selects the one of the first and second candidate data strings based on a result of the error detection.

8. The data reproduction apparatus as claimed in claim 7, wherein said data selection means performs the error detection on the first and second candidate data strings by employing a technique of a parity check.

9. The data reproduction apparatus as claimed in claim 7 or 8, wherein said data selection means selects the first candidate data string if an error is detected from each of first and second candidate data.

10. The data reproduction apparatus as claimed in any of claims 7 through 9, wherein:

more than one alternative path is selected in said alternative path selection means and exists when the first path string corresponding to the first candidate data of the given length is selected;
said second candidate data generation means generates a plurality of second path strings by employing the alternative paths by ones, or by twos or more, and generates a plurality of second candidate data strings corresponding to the second path strings; and
said data selection means selects the one of the first and second candidate data.

11. The data reproduction apparatus as claimed in any of claims 7 through 10, further comprising:

a memory unit for storing the string of the paths selected in accordance with the given rule, information on the difference between the compared ones of the path metric values, the difference being calculated in said difference calculation means, and the first candidate data string generated in said first candidate data generation means in said reproduced data determination means,
wherein said alternative path selection means for selecting the alternative path based on the string of the paths and the information on the difference between the compared ones of the path metric values stored in said memory unit, said second candidate data generation means for generating the second candidate data string based on the string of the paths stored in said memory unit and the alternative path selected in said alternative path selection means, and said data selection means for selecting the one of the first candidate data stored in said memory unit and the second candidate data generated in the second candidate data generation means operate in accordance with a synchronizing clock different from a reference clock employed for selecting the string of the paths, calculating the difference of the compared ones of the path metric values, and generating the first candidate data.

12. The data reproduction apparatus as claimed in claim 11, wherein the synchronizing clock is faster than the reference clock.

* * * * *